(12) United States Patent
Munro et al.

(10) Patent No.: US 8,781,334 B2
(45) Date of Patent: Jul. 15, 2014

(54) QUANTUM REPEATER AND SYSTEM AND METHOD FOR CREATING EXTENDED ENTANGLEMENTS

(76) Inventors: William Munro, Bristol (GB); Keith Harrison, Chepstow (GB); Timothy Spiller, Tikley (GB); Kae Nemoto, Tokyo (JP)

(*) Notice: Subject to any disclaimer, the term of this patent is extended or adjusted under 35 U.S.C. 154(b) by 261 days.

(21) Appl. No.: 13/319,372

(22) PCT Filed: Oct. 26, 2009

(86) PCT No.: PCT/EP2009/064067
§ 371 (c)(1),
(2), (4) Date: Dec. 9, 2011

(87) PCT Pub. No.: WO2010/127723
PCT Pub. Date: Nov. 11, 2010

(65) Prior Publication Data
US 2012/0134675 A1    May 31, 2012

(30) Foreign Application Priority Data

May 8, 2009 (GB) .................................... 0907936.9
Jun. 30, 2009 (GB) .................................... 0911271.5

(51) Int. Cl.
*H04B 10/00* (2013.01)
(52) U.S. Cl.
USPC ............................. 398/173; 398/180; 398/64
(58) Field of Classification Search
USPC ........................................... 398/64, 173–181
See application file for complete search history.

(56) References Cited

U.S. PATENT DOCUMENTS

| | | | | |
|---|---|---|---|---|
| 7,277,636 B1* | 10/2007 | Gazdzinski | ..................... | 398/53 |
| 7,317,574 B2* | 1/2008 | Zoller et al. | .................. | 359/577 |
| 7,359,101 B2* | 4/2008 | Beausoleil et al. | ........... | 359/107 |
| 7,518,120 B2* | 4/2009 | Monroe et al. | ................. | 250/393 |
| 7,532,400 B2* | 5/2009 | Zoller et al. | .................. | 359/577 |

(Continued)

FOREIGN PATENT DOCUMENTS

| | | |
|---|---|---|
| EP | 1383267 B1 | 5/2006 |
| EP | 1865657 A1 | 12/2007 |

(Continued)

OTHER PUBLICATIONS

Chin-Wen Chou et al: "Functional quantum nodes for entanglement distribution over scalable quantum networks " Science American Association for the Advancement of Science USA, vol. 326, No. 5829, Jun. 1, 2007, pp. 1316-1320.

(Continued)

*Primary Examiner* — Agustin Bello

(57) ABSTRACT

An iterative method is provided for progressively building an end-to-end entanglement between qubits in first and second end nodes (91, 92) of a chain of nodes whose intermediate nodes (90) are quantum repeaters. At each iteration, a current operative repeater (90) of the chain merges an entanglement existing between qubits in the first end node (91) and the operative repeater, with a local entanglement formed between qubits in the operative repeater and its neighbor node towards the second end node (92). For the first iteration, the operative repeater is the neighbor of the first end node (91); thereafter, for each new iteration the operative repeater shifts one node further along the chain toward the second end node (92). A quantum repeater adapted for implementing this method is also provided.

13 Claims, 18 Drawing Sheets

(56) References Cited

U.S. PATENT DOCUMENTS

| | | | |
|---|---|---|---|
| 7,630,604 B2 * | 12/2009 | Waks et al. | 385/50 |
| 7,848,603 B2 * | 12/2010 | Waks et al. | 385/50 |
| 7,889,992 B1 * | 2/2011 | DiVincenzo et al. | 398/115 |
| 8,050,410 B2 * | 11/2011 | Sanders et al. | 380/278 |
| 8,103,172 B2 * | 1/2012 | Peters et al. | 398/173 |
| 8,135,276 B2 * | 3/2012 | Munro et al. | 398/39 |
| 8,270,841 B2 * | 9/2012 | Nishioka et al. | 398/140 |
| 2003/0002674 A1 | 1/2003 | Nambu et al. | |
| 2004/0131179 A1 | 7/2004 | Ichimura et al. | |
| 2004/0264958 A1 * | 12/2004 | Zoller et al. | 398/40 |
| 2005/0111665 A1 | 5/2005 | Ichimura et al. | |
| 2008/0025804 A1 | 1/2008 | Heule | |
| 2008/0089696 A1 * | 4/2008 | Furuta | 398/175 |
| 2008/0101800 A1 * | 5/2008 | Waks et al. | 398/178 |
| 2008/0137868 A1 * | 6/2008 | Sanders et al. | 380/278 |
| 2008/0144836 A1 * | 6/2008 | Sanders et al. | 380/278 |
| 2008/0258049 A1 | 10/2008 | Kuzmich et al. | |
| 2009/0016736 A1 * | 1/2009 | Beal et al. | 398/144 |
| 2009/0097862 A1 * | 4/2009 | Munro et al. | 398/175 |
| 2009/0317089 A1 * | 12/2009 | Peters et al. | 398/173 |
| 2010/0226659 A1 * | 9/2010 | Nishioka et al. | 398/154 |
| 2010/0293380 A1 * | 11/2010 | Wiseman et al. | 713/169 |
| 2011/0222848 A1 * | 9/2011 | Lukin et al. | 398/25 |
| 2012/0050834 A1 * | 3/2012 | Harrison et al. | 359/107 |
| 2012/0093521 A1 * | 4/2012 | Harrison et al. | 398/173 |
| 2012/0134675 A1 * | 5/2012 | Munro et al. | 398/58 |
| 2012/0148237 A1 * | 6/2012 | Harrison et al. | 398/37 |
| 2012/0155870 A1 * | 6/2012 | Harrison et al. | 398/45 |
| 2012/0177201 A1 * | 7/2012 | Ayling et al. | 380/278 |

FOREIGN PATENT DOCUMENTS

| | | |
|---|---|---|
| GB | 2456347 | 10/2010 |
| JP | 2007-329865 | 12/2007 |
| WO | WO-02/097725 A2 | 12/2002 |
| WO | WO-2006/019858 | 2/2006 |
| WO | WO-2006/019858 A2 | 2/2006 |
| WO | WO-2007/021945 A2 | 2/2007 |
| WO | WO-2007/102408 A1 | 9/2007 |
| WO | WO-2009/155486 A1 | 12/2009 |

OTHER PUBLICATIONS

Van Meter, et al; "System Design for a Long-Line Quantum Repeater," IEEE/ACM Transaction on Networking, vol. 17, No. 3. Jun. 1, 2009, pp. 12.

Wu Xiang-Sheng; Memory-Based Quantum Repeater in Quantum Information Communication, China Phys. Soc. and IOP Publishing Ltd., vol. 13, No. 2, Feb. 2, 2004, pp. 5.

Bennett, et al "Teleporting an unknown quantum state via dual classical and Einstein-Podolsky-Rosen channels", Physical Review Letters, American Physical Society, New York, US :LNKD-DOI: 10.1103/PHYSREVLETT.70.1895, vol. 70, No. 13, Mar. 29, 1993, pp. 1895-1899.

Collins, et al; "Multiplexed Memory-Insensitive Quantum Repeaters"; Physical Review Letters, American Physical Society, New York, US LNKDDOI:I0:II03/PHYSREVLETT.98.060502, vol. 98, No. 6, Feb. 9, 2007, pp. 60502/1-60502/4.

Duan, et al; "Long-distance quantum communication with atomic ensembles and linear optics", Nature, vol. 414, pp. 413-418, Nov. 22, 2001.

GB Search Report received in Application No. GB0907936.9, mailed Aug. 31, 2010, pp. 12.

International Search Report and Written Opinion received in PCT Application No. PCT/EP/2009/064067, mailed Oct. 6, 2010, pp. 15.

Razavi, et al; "Physical and architectural considerations in quantum repeaters", Proceedings of the International Society for Optical Engineering, Quantum Communications Realized II, San Jose, US, Jan. 28, 2009, vol. 7236, pp. 723603-723615.

Cheng Lam Lam, Hideaki Matsueda, "Quantum Information Processing by Quantum Entanglement", Memoirs of the Faculty of Science, Kochi University, Japan, Department of Information Science, Faculty of Science, Kochi University, [Online], Mar. 25, 2005, vol. 26 (2005), No. 6, p. 1-22, [Search on May 21, 2013], Internet URL, <http:/memoirs.is.kochi-u.ac.jp/Vol26/MemoirsF26-6.pdf>.

Guo-Ping Guo, Chuan-Feng Li, Guang-Can Guo, "Quantum nondemolition measurement of nonlocal variables and its application in quantum authentication", arXiv:quant-ph/0103088, Quantum Physics, [online], May 15, 2001, [retrieved on Feb. 25, 2013]. Retrieved from the Internet, URL <http://arxiv.org/pdf/quant-ph/0103088v1.pdf>.

Liang Jiang, et al., "Quantum repeater with encoding", Physical Review A, Mar. 20, 2009, vol. 29, Issue 3, pp. 32325-1~10.

P. van Loock, et al., "Hybrid Quantum Repeater Using Bright Coherent Light", Physical Review Letters, Jun. 23, 2006, vol. 96, pp. 240501-1~4.

Robert Raussendorf and Hans J. Briegel, "A One-Way Quantum Computer", Physical Review Letters, [Online], May 28, 2001, vol. 86, Issue 22, p. 5188-5191, [retrieved on May 21, 2013]. Retrieved from the Internet URL <http://prl.aps.org/pdf/PRL/v86/i22/p5188_1>.

Satoshi Ishizaka, "Classification and detection methods of the quantum states toward the optimal entanglement distillation protocol", [Quanta and Information] Abstracts of Lectures of 1st Reaearch Completion Report Meeting, Japan, [Online] Nov. 16, 2006, p. 1-8, [Search on May 21, 2013], Internet URL <http://www.jst.go.jp/kisoken/presto/complete/ryousi/sympo/youchi/ishizaka.pdf>.

* cited by examiner

ELONGATE OPERATION (a)

(b)

(c)

"X Measurement" 12

(d)

QUANTUM REPEATER AND SYSTEM AND METHOD FOR CREATING EXTENDED ENTANGLEMENTS

The present invention relates to quantum repeaters and to systems and methods for creating extended entanglements.

BACKGROUND OF THE INVENTION

In quantum information systems, information is held in the "state" of a quantum system; typically this will be a two-level quantum system providing for a unit of quantum information called a quantum bit or "qubit". Unlike classical digital states which are discrete, a qubit is not restricted to discrete states but can be in a superposition of two states at any given time.

Any two-level quantum system can be used for a qubit and several physical implementations have been realized including ones based on the polarization states of single photons, electron spin, nuclear spin, and the coherent state of light.

Quantum network connections provide for the communication of quantum information between remote end points. Potential uses of such connections include the networking of quantum computers, and "quantum key distribution" (QKD) in which a quantum channel and an authenticated (but not necessarily secret) classical channel with integrity are used to create shared, secret, random classical bits. Generally, the processes used to convey the quantum information over a quantum network connection provide degraded performance as the transmission distance increases thereby placing an upper limit between end points. Since in general it is not possible to copy a quantum state, the separation of endpoints cannot be increased by employing repeaters in the classical sense.

One way of transferring quantum information between two spaced locations uses the technique known as 'quantum teleportation'. This makes uses of two entangled qubits, known as a Bell pair, situated at respective ones of the spaced locations; the term "entanglement" is also used in the present specification to refer to two entangled qubits The creation of such a distributed Bell pair is generally mediated by photons sent over an optical channel (for example, an optical waveguide such as optical fibre). Although this process is distance limited, where a respective qubit from two separate Bell Pairs are co-located, it is possible to combine (or 'merge') the Bell pairs by a local quantum operation effected, between the co-located qubits. This process, known as 'entanglement swapping', results in an entanglement between the two non co-located qubits of the Bell pairs while the co-located qubits cease to be entangled, at all.

The device hosting the co-located qubits and which performs the local quantum operation to merge the Bell pairs is called a "quantum repeater". The basic role of a quantum repeater is to create a respective Bell pair with each of two neighbouring spaced nodes and then to merge the Bell pairs. By chaining multiple quantum repeaters, an end-to-end entanglement can be created between end points separated by any distance thereby permitting the transfer of quantum information between arbitrarily-spaced end points.

It may be noted that while QKD does not directly require entangled states, the creation of long-distance Bell pairs through the use of quantum repeaters facilitates long-distance QKD. Furthermore, most other applications of distributed quantum computation will use distributed Bell pairs.

The present invention is concerned with the creation of entanglement between spaced qubits and with the form, management and interaction of quantum repeaters to facilitate the creation of entanglements between remote end points.

SUMMARY OF THE INVENTION

According to the present invention, there is provided a quantum repeater as set out in the accompanying claim 1. The quantum repeater is usable as a intermediate node in a chain of nodes, to permit an end-to-end entanglement between qubits in end nodes of the chain of nodes Also provided is a method of creating an end-to-end entanglement between qubits in end nodes of a chain of nodes whose intermediate nodes are quantum repeaters, the method being as set out in accompanying claim 10.

BRIEF DESCRIPTION OF THE DRAWINGS

Embodiments of the invention will now be described, byway of non-limiting example, with reference to the accompanying diagrammatic drawings, in which.

BEST MODE OF CARRYING OUT THE INVENTION

Figure 1A:
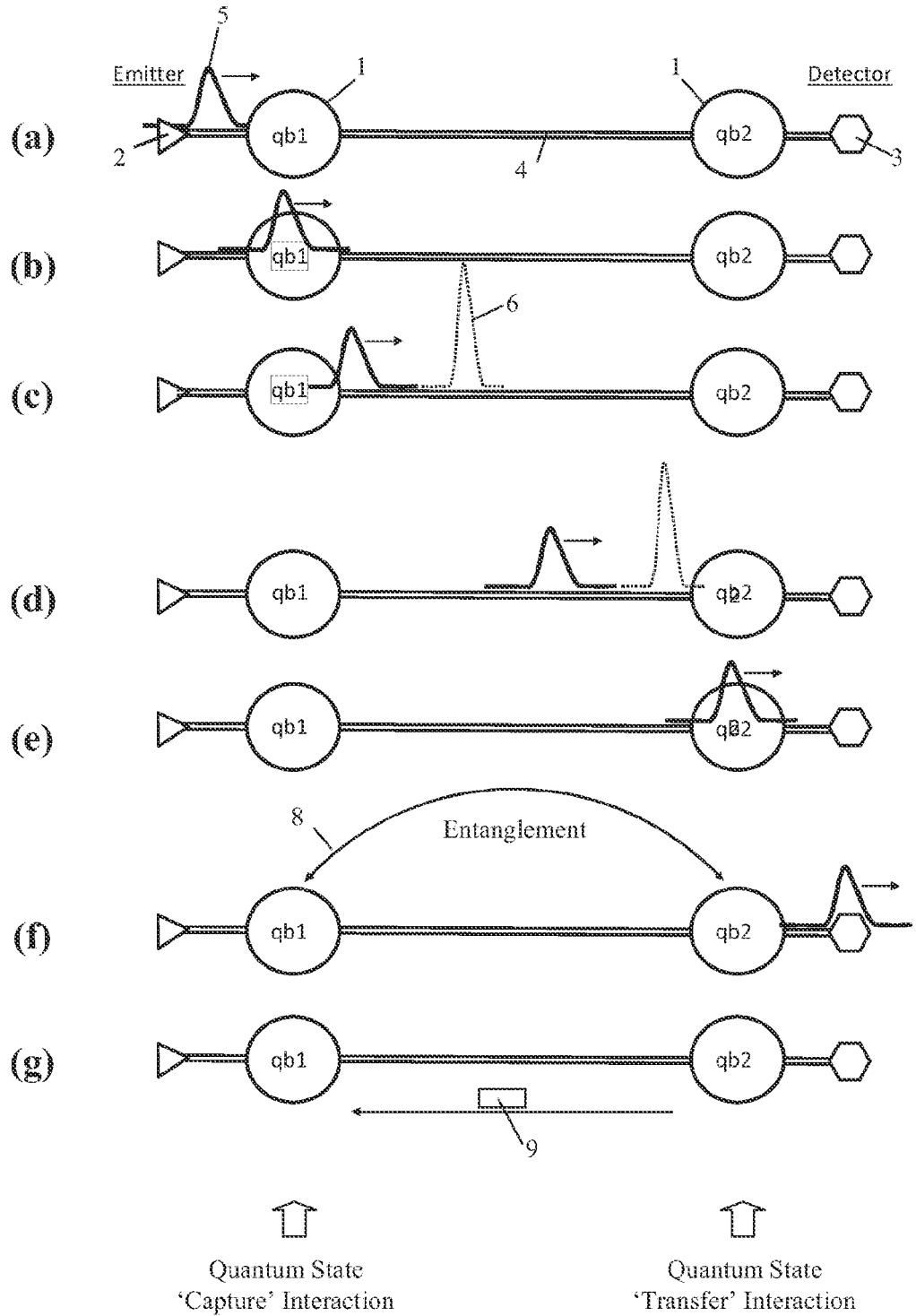
FIG. 1A is a diagram depicting a known operation for entangling two qubits.

Basic Entanglement Creation and Extension Operations
Entanglement Operation (FIG. 1A)

FIG. 1A depicts, in general terms, a known process (herein referred to as an "entanglement operation") for entangling two qubits qb1, qb2 (referenced 1) to create a Bell pair, the Figure showing a time series of snapshots (a) to (g) taken over the course of the entanglement operation. Where, as in the present case, the qubits qb1, qb2 are separated by a distance greater than a few millimeters, the creation of a Bell pair is mediated by photons, which may be sent through free space or over a waveguide such as optical fibre 4. Very generally, processes for Bell-pair creation may be divided, into those that use very weak amounts of light (single photons, pairs of photons, or laser pulses of very few photons) and those that use pulses of many photons from a coherent source, such as a laser. As will be understood by persons skilled in the art, the details of the methods of creating photons, performing entanglement operations, and making measurements differ depending on whether very weak amounts of light or laser pulses of many photons are used; however, as the present invention can be implemented using any such approach, the following description will be couched simply in terms of a "light field" being used to create (and subsequently extend) Bell Pairs.

Considering FIG. 1A in more detail, a light field 5 emitted by an emitter 2 (snapshot (a)) is passed through the physical qubit qb1 (snapshot (b)) which is in a prepared non-classical state (for example: 0, +1); typically, the physical qubit implementation is as electron spin, the electron being set into a predetermined state immediately prior to passage of the light field. The light field 5 and qubit qb1 interact, with the light field 5 effectively 'capturing' the quantum state of the qubit qb1. The light field 5 then travels down the optical fibre 4 (snapshots (c) and (d)) and interacts with qubit qb2 (snapshot (e)) before being measured at detector 3 (snapshot (f)); if successful, this results in the 'transfer' of the quantum state of qubit qb1 to qubit qb2, entangling these qubits (in FIG. 1A, this entanglement is represented by double-headed arrowed arc 8, this form of representation being used generally throughout the drawings to depict entanglements). The properties of the light field 5 measured by detector 13 enable a determination to be made as whether or not the entanglement operation was successful. The success or failure of the entanglement operation is then passed back to the qb1 end of the fibre 4 in a classical (non-quantum) message 9 (snapshot (g)). This message can be very simple in form (the presence or absence of a single pulse) and as used herein the term "message" is to be understood to encompass both such simple forms as well as structured messages of any degree of complexity (subject to processing time constraints); in embodiments where the message 9 needs to identify a particular qubit amongst several as well as the success or failure of an entanglement operation, the message may still take the form of the presence or absence of a single pulse with the timing of the latter being used to identify the qubit concerned. Where there is a need to transmit information about the success/failure of the entanglement operation (or to identify an involved qubit) back to the qb1 end of the fibre 4, the overall elapsed time for the entanglement operation is at least the round trip propagation time along the fibre 4, even where the entanglement operation is successful.

An entanglement operation can be performed to entangle qubits qb1 and qb2 whether or not qb2 is already entangled with another qubit (in the case of qb2 already being entangled with another qubit qbj when an entanglement operation is performed between qb1 and qb2, this results in the states of all three qubits qb1, qb2 and qbj becoming entangled).

The properties of the light field 5 measured by detector 3 also enable a determination to be made, in the case of a successful entanglement operation, as to whether the entangled states of the qb1 and qb2 are correlated or anti-correlated, this generally being referred to as the 'parity' of the entanglement (even and odd parity respectively corresponding to correlated and anti-correlated qubit states). It is normally important to know the parity of an entanglement when subsequently using it; as a result, either parity information must be stored or steps taken to ensure that the parity always ends up the same (for example, if an odd parity is determined, the state of qb2 can be flipped to produce an even parity whereby the parity of the entanglement between qb1 and qb2 always ends up even).

In fact, the relative parity of two entangled, qubits is a two dimensional quantity often called the "generalized parity" and comprising both a qubit parity value and a conjugate qubit parity value. For a simple entanglement operation as depicted in FIG. 1A, the conjugate qubit parity value information is effectively even parity and need not be measured. "Generalized parity" requires two classical bits to represent it. In certain applications (such as QKD), knowledge of the conjugate qubit parity value information may not be required. Hereinafter, except where specific reference is being made to one of the components of "generalized parity" (that is, to the qubit parity value or the conjugate qubit parity value), reference to "parity" is to be understood to mean "generalized parity" but with the understanding that in appropriate cases, the conjugate qubit parity value information can be omitted.

As already indicated, the qubits qb1 and qb2 are typically physically implemented as electron spin. However, the practical lifetime of quantum information stored in this way is very short (of the order of $10^{-6}$ seconds cumulative) and therefore generally, immediately following the interaction of the light field 5 with qb1 and qb2, the quantum state of the qubit concerned is transferred to nuclear spin which has a much longer useful lifetime (typically of the order of a second, cumulatively). The quantum state can be later transferred back to electron spin for a subsequent light field interaction (such as to perform a merge of two entanglements, described, below).

Another practical feature worthy of note is that the physical qubits qb1 and qb2 are generally kept shuttered from light except for the passage of light field 5. To facilitate this at the qb2 end of the fibre 4 (and to trigger setting the qubit into a prepared state immediately prior to its interaction with light field 5), the light field 5 can be preceded by a 'herald' light pulse 6; this light pulse is detected at the qb2 end of the fibre 14 and used to trigger priming of the qubit qb2 and then its un-shuttering for interaction with the light field 5. Other ways of triggering these tasks are alternatively possible.

The relationship between the probability of successfully creating a Bell pair, the distance between qubits involved, and the fidelity of the created pair is complex. By way of example, for one particular implementation using a light field in the form of a laser pulse of many photons. Bell pairs are created with fidelities of 0.77 or 0.638 for 10 km and 20 km distances respectively between qubits, and the creation succeeds on thirty eight to forty percent of the attempts. The main point is that the entanglement operation depicted, in FIG. 1A is distance limited; for simplicity, in the following a probability of success of 0.25 is assumed at a distance of 10 km.

Figure 2:
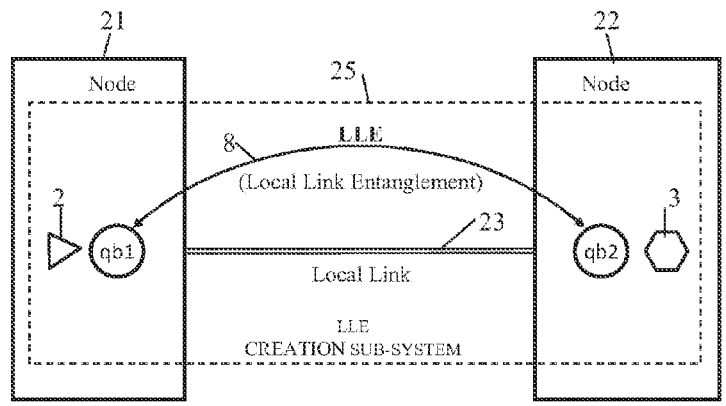
FIG. 2 is a diagram depicting an entanglement creation subsystem for carrying out an entanglement operation between two qubits located in respective, spaced, nodes.

LLE Creation Subsystem (FIG. 2)

An assembly of components for carrying out an entanglement operation is herein referred to as an "entanglement creation subsystem" and may be implemented locally within a piece of apparatus or between remotely located pieces of apparatus (generally referred to as nodes). FIG. 2 depicts an example of the latter case where two nodes 21 and 22 are optically coupled by an optical fibre 23; optical fibres, such as the fibre 23, providing a node-to-node link are herein called "local link" fibres. The nodes 21, 22 of FIG. 2 include components for implementing respective qubits qb1 and qb2 (for ease of understanding, the same qubit designations are used in FIG. 2 as in FIG. 1A). The qubits qb1 and qb2, together with an emitter 2 associated with qb1, a detector 3 associated with qb3, the local link fibre 23 and entanglement-operation control logic in each node (not shown), form an entanglement creation subsystem 25 for creating an entanglement 8 between qubits qb1 and qb2. An entanglement of this sort created by a light field, passed across a local link fibre between nodes is herein called a "local link entanglement" or "LLE"; the node-spanning entanglement creation subsystem 25 is correspondingly called an "LLE creation subsystem".

Figure 1B:
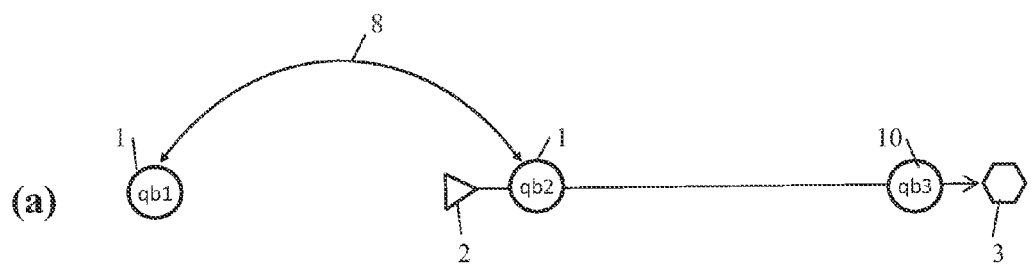
FIG. 1B is a diagram depicting an elongate operation for extending an existing entanglement to create a new entanglement involving one of the originally-entangled qubits and a new qubit.
Figure 1B:
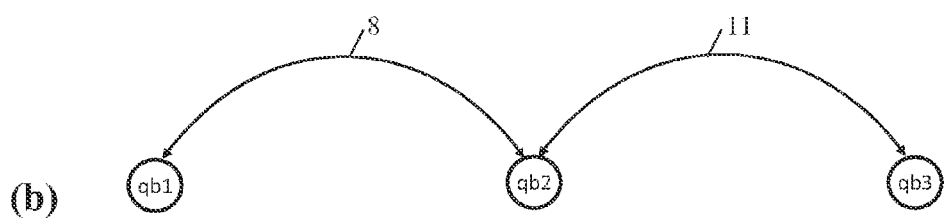
Figure 1B:
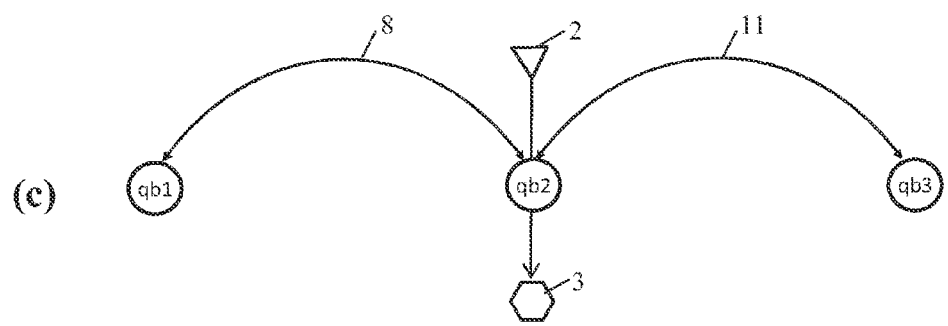
Figure 1B:
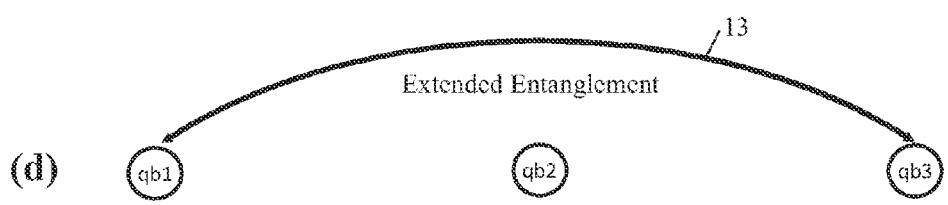

Elongate Operation (FIG. 1B)

Figure 1C:
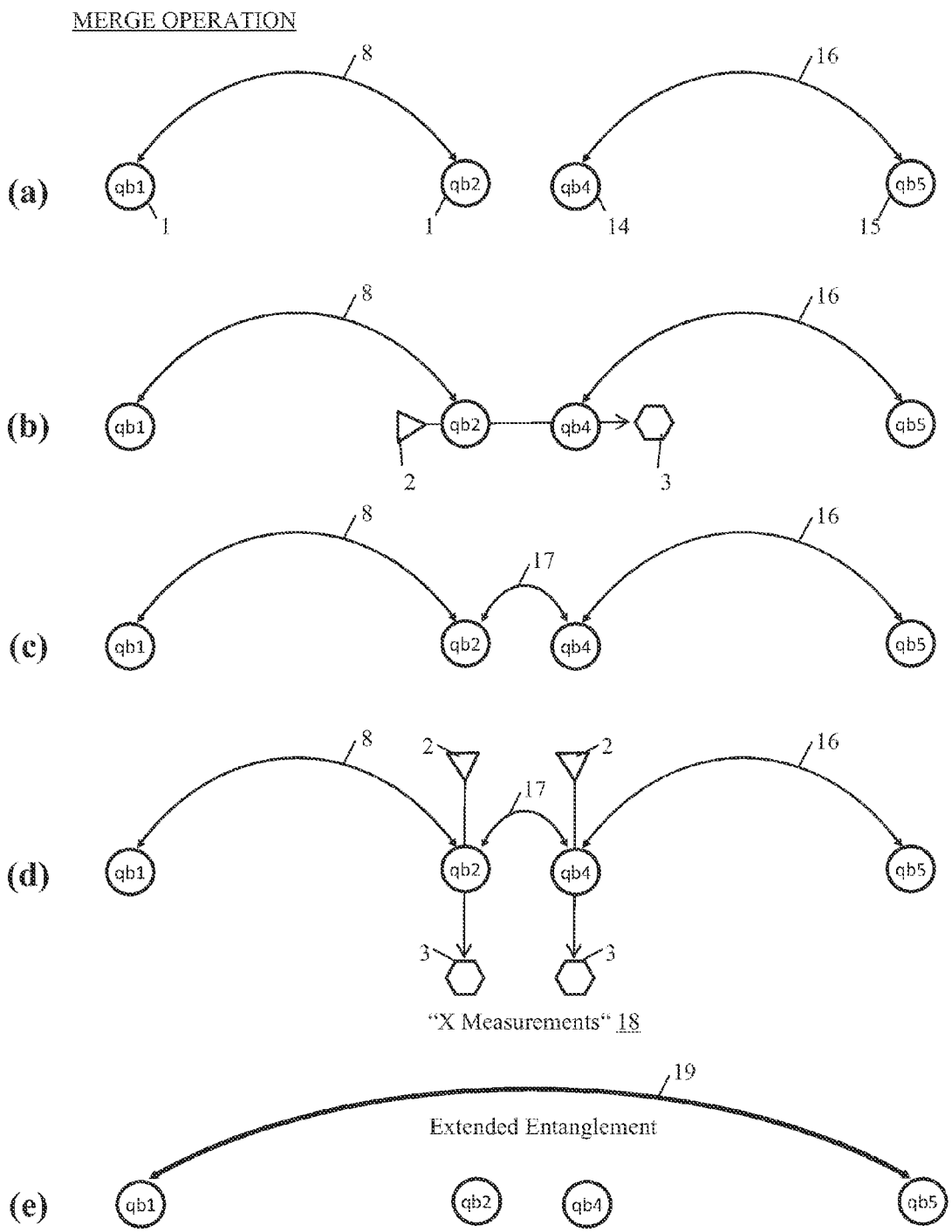
FIG. 1C is a diagram depicting a merge operation for extending an existing entanglement by merging it with another entanglement to create a new entanglement involving one qubit from each of the original entanglements.

An entanglement such as created by a FIG. LA entanglement operation can be 'extended' to create a new entanglement involving one of the originally-entangled qubits and a new qubit, the latter typically being located at a greater distance from the involved originally-entangled qubit than the other originally-entangled qubit. FIGS. 1B and 1C illustrate two ways of extending an initial entanglement 8 between qubits qb1 and qb2 (referenced 1) to form an entanglement between qubit qb1 and another qubit; both ways involve the passing of light fields through various qubits followed by measurement of the light fields but, for simplicity, the light fields themselves and the optical fibres typically used to channel them have been omitted from FIGS. 1B and 1C.

FIG. 1B illustrates, by way of a time series of snapshots (a) to (d), an entanglement extension process that is herein referred to as an "elongate operation". In general terms, an elongate operation involves further entangling a qubit of an existing first entanglement with a qubit that is not involved in the first entanglement (though it may already be involved in a different entanglement) to form a linked series of entanglements from which the intermediate qubit (that is, the qubit at the end of the first entanglement being extended) is then removed by measurement to leave an 'extended' entanglement between the remaining qubit of the first entanglement and the newly entangled qubit. FIG. 1B illustrates an elongate operation for the simplest case where the qubit that is not involved in the first entanglement is not itself already entangled. More particularly, as shown in snapshot (a) of FIG. 1B, qubit qb2 of an existing entanglement 8 involving qubits qb1 and qb2 (both referenced 1), is further entangled with a qubit qb3 (referenced 10) by means of an entanglement operation. This entanglement operation involves a light field, emitted by an emitter 2, being passed through qubits qb2 and qb3 before being measured by a detector 3. Snapshot (b) depicts the resulting entanglement 11 between qb2 and qb3. The entanglements 8 and 11 form a linked series of entanglements—which is another way of saying that the states of qb1, qb2 and qb3 are now entangled with each other. A particular type of measurement, herein an "X measurement" (referenced 12 in FIG. 1B), is then effected on the intermediate qubit qb2 by sending a light field, from an emitter 2 through qb2 and detecting it with, a detector 3, thereby to eliminate qb2 from entanglement with qb1 and qb3 (see snapshot (c)) leaving qb1 and qb3 entangled. A characteristic of the X measurement 12 is that it is done in a manner so as to give no information about the rest of the quantum state of entangled qubits qb1 and qb3; for example, for a joint state between qubits qb1, qb2 and qb3 like "a|000>+b|111>" where a and b are probability amplitudes, an X measurement on qubit qb2 would give a state for the entanglement between qb1 and qb3 of either "a|00>+b|11>" (for an X measurement result of +1) or "a|00>−b|11>" (for an X measurement result of −1). This measurement does not give any information about a or b.

After the X measurement 12 has been made to eliminate qb2 from entanglement, an extended entanglement is left between qb1 and qb3—this extended, entanglement is depicted as medium thick are 13 in snapshot (d) of FIG. 1B.

The parity of the extended entanglement 13 is a combination of the parities of the entanglements 8 and 11 and a conjugate qubit parity value determined from the X measurement (in the above example, the X measurement gives either a +1 or −1 result—this sign is the conjugate qubit parity value). Where qubit parity value information and conjugate qubit parity value information are each represented by binary values '0' and '1' for even and odd parity respectively, the qubit parity value information and conjugate qubit parity value information of the extended, entanglement are respective XOR (Exclusive OR) combinations of the corresponding component parities.

It may be noted that a functionally equivalent result to the FIG. 1B elongate operation can be obtained by first entangling qb3 with qb2 by means of an entanglement operation in which the mediating light field passes first through qb3, and then removing qb2 from entanglement by effecting an X measurement on it. In the present specification, for linguistic clarity, reference to an 'elongate operation' (with its integral X measurement) only encompasses the case where the initial entanglement performed as part of the elongate operation is effected by a light field first passing through a qubit of the entanglement being extended; the above described functional equivalent to the elongate operation is treated, as being separate entanglement and X measurement operations.

Where the objective is to set up an entanglement between two qubits spaced by a substantial distance, the elongate operation described above with reference to FIG. 1B is not that useful by itself. This is because should the component entanglement operation (see (a) of FIG. 1B) fail, then the pre-existing entanglement that is being extended (entanglement 8 in FIG. 1B) will be destroyed. In effect, the probability of successfully creating the extended entanglement 13 is the product of the success probabilities of the entanglement operations used to create entanglements 8 and 11. As already noted, the probability of a successful entanglement operation is distance related so the chances of successfully creating an entanglement over long distances using only elongate operations to successively extend an initial entanglement, are poor. The same problem exists with the described functional equivalent of the elongate operation.

Merge Operation (FIG. 1C)

A better approach is to use the merge operation illustrated in FIG. 1C to knit together independently created entanglements that individually span substantial distances; this approach effectively decouples the success probabilities associated, with the individual entanglements as a failure of one attempt to create such an entanglement does not destroy the other entanglements. Of course, to be useful, the merge operation used to join the individual entanglements must itself be highly reliable and this is achieved by carrying it out over extremely short distances.

FIG. 1C illustrates, by way of a time series of snapshots (a) to (e), an example embodiment of a merge operation for 'extending' an entanglement 8 existing between qubits qb1 and qb2 by merging it with another entanglement 16 that exists between qubits qb4 (referenced 14) and qb5 (referenced 15), in order to end up with an 'extended entanglement' between qb1 and qb5 (medium thick are 19 in FIG. 1C). The qubits qb2 and qb4 are located in close proximity to each other (typically within tens of millimeters). The order in which the entanglements 8 and 16 are created is not relevant (indeed they could be created simultaneously); all that is required is that both entanglements exist in a usable condition at a common point in time. At such a time, the entanglements 8 and 16 are "merged" by a quantum operation carried out locally on qubits qb2 and qb4. (Where the quantum states of qubits qb2, qb4 have been transferred from electron spin to nuclear spin immediately following the creation of the LLEs 8, 16 respectively, these states need to be transferred back to electron spin before the merge operation is effected). The local merge operation involves a first process akin to that of FIG. 1A entanglement operation effected by passing a light field, emitted by an emitter 2, successively through the two qubits qb2 and qb4, or vice versa, and then measuring the light field (see snapshot (b) of FIG. 1C). This first process, if successful, results in the qubits qb2 and qb4 becoming entangled (as indicated, by entanglement 17 in snapshot (c) of FIG. 1C) creating a linked series of entanglements by which qubits qb1 and qb5 are entangled with each other. A second measurement process comprising one or more X measurements 18 (see snapshot (d) of FIG. 1C) is then used, to remove the intermediate qubits qb2 and qb4 from the entangled whole leaving an 'extended' entanglement 19 between the qubits qb1 and qb5 The qubits qb2 and qb4 finish up neither entangled with each other nor with the qubits qb1, qb5. Because the merge operation is a local operation between two co-located qubits, the probability of success is very high.

The measurements made as part of the merge operation provide both an indication of the success or otherwise of the merge, and an indication of the "generalized parity" of the merge operation. For example, the first merge-operation process may measure a qubit parity value and the second, merge-operation process, the conjugate qubit parity value. In this case, the second process can be effected either as a single X measurement using a light field passed through both qubits qb2 and qb4 (in which case the light field has a different value to that used in the first process e.g. 0,+1 as opposed to 0,−1), or as individual X measurements, subsequently combined, made individually on qb2, and qb4, the latter approach being depicted in FIG. 1C. The parity of the extended entanglement 19 will be a combination of the parities of the entanglements 8 and 15 and the parity of the merge operation. As before, where qubit parity value information and conjugate qubit parity value information are each represented by binary values '0' and '1' for even and odd parity respectively, the qubit parity value information and conjugate qubit parity value information of the extended entanglement are respective XOR (Exclusive OR) combinations of the corresponding component parities.

Information about the success or otherwise of the merge operation is passed in classical messages to the end qubit locations as otherwise these locations do not know whether the qubits qb1, qb5 are entangled; alternatively since the failure probability of a merge operation is normally very low, success can be assumed and no success/failure message sent—in this case, it will be up to applications consuming the extended entanglement 19 to detect and compensate for merge failure leading to absence of entanglement. As the parity of the extended entanglement will normally need to be known to make use of the entangled qubits, parity information needed, to determine the parity of the extended entanglement 19 is also passed on to one or other of the end qubit locations.

It will be appreciated that the form of merge operation described above with respect to FIG. 1C is effectively an elongate operation carried, out over a very short distance between qb2 and qb4 to extend entanglement 8, together with an X measurement on qb4 to remove it from entanglement (qb2 having been removed from entanglement by the X measurement performed as part of the elongate operation). Of course, unlike the FIG. 1B example elongate operation where the qubit qb3 to which the entanglement 8 is being extended is not itself already entangled, the equivalent qubit qb4 in FIG. 1C is already involved in a second entanglement 16; however, as already noted, an elongate operation encompasses this possibility.

As already noted, the merge operation is a local operation (between qubits qb2 and qb3 in FIG. 1C) that is effected over a very short distance and thus has a high probability of success. A merge operation takes of the order of $10^{-9}$ secs.

Figure 3A:
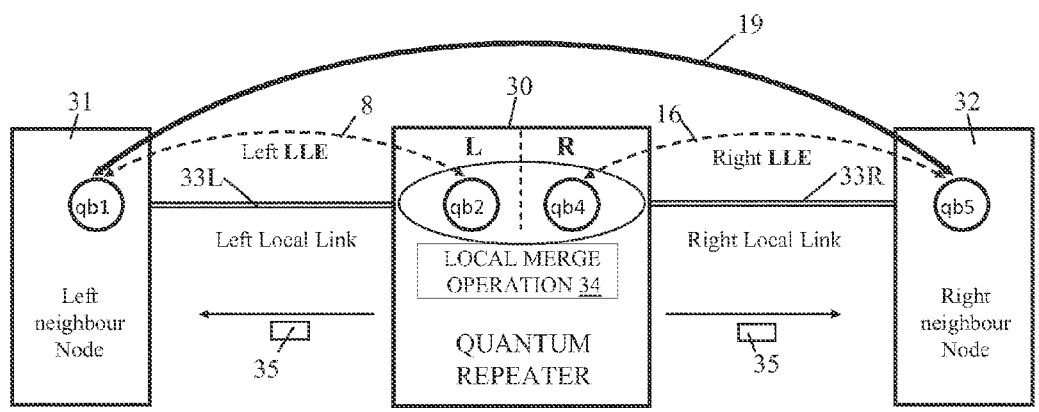
FIG. 3A is a diagram depicting how a quantum repeater can be used to create an entanglement between two qubits over a distance greater than that possible using the FIG. 1A entanglement operation alone.
Figure 3B:
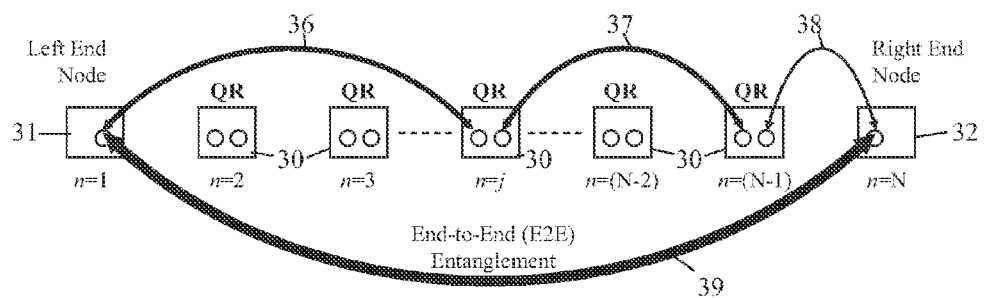
FIG. 3B is a diagram illustrating how a chain of quantum repeaters, can be used to create an extended entanglement between any arbitrarily spaced pair of nodes.

Quantum Repeater (FIGS. 3A & 3B)

In practice, when seeking to create an extended entanglement between two qubits which are located in respective end nodes separated by a distance greater than that over which a basic entanglement operation can be employed with any reasonable probability of success, one or more intermediate nodes, called quantum repeaters, are used to merge basic entanglements that together span the distance between the end nodes. Each quantum repeater node effectively implements a merge operation on a local pair of qubits that correspond, to the qubits qb2 and qb4 of FIG. 1C and are involved in respective entanglements with qubits in other nodes. FIG.

3A depicts such a quantum repeater node 30 forming one node in a chain (sequential series) of nodes terminated by left and right end nodes 31 and 32 that respectively accommodate the qubits qb1, qb5 it is desired to entangle (but which are too far apart to entangle directly using an entanglement operation). In the present example, the chain of nodes comprises three nodes with the left and right end nodes 31, 32 also forming the left and right neighbour nodes of the quantum repeater 30. The quantum repeater 30 is connected to its left and right neighbour nodes 31, 32 by left and right local link optical fibres 33L and 33R respectively. It is to be noted that the terms "left" and "right" as used throughout the present specification are simply to be understood as convenient labels for distinguishing opposite senses (directions along: ends of; and the like) of the chain of nodes that includes a quantum repeater.

The quantum repeater 30 effectively comprises left and right portions or sides (labeled "L" and "R" in FIG. 3A) each comprising a respective qubit qb2, qb4 (for ease of understanding, the same qubit designation are used, in FIG. 3A as in FIG. 1C). The qubit qb1 of the left neighbour node 31 and qb2 of the quantum repeater node 30 are part of a LLE creation subsystem formed between these nodes and operative to create a left LLE 8 (shown as a dashed arrowed are 8 in FIG. 3A) between qb1 and qb2. Similarly, the qubit qb5 of the right neighbour node 32 and qb4 of the quantum repeater node 30 are part of a LLE creation subsystem formed, between these nodes and operative to create a right LLE 16 between qb5 and q4.

It may be noted that the direction of travel (left-to-right or right-to-left) of the light field used to set up each LLE is not critical whereby the disposition of the associated emitters and detectors can be set as desired. For example, the light fields involved in creating LLEs 8 and 16 could both be sent out from the quantum repeater 30 meaning that the emitters are disposed in the quantum repeater 30 and the detectors in the left and right neighbour nodes 31, 32. However, to facilitate chaining of quantum repeaters of the same form, it is convenient if the light fields all travel in the same direction along the chain of nodes; for example, the light fields can be arranged all to travel from left to right in which case the left side L of the quantum repeater 30 will include the detector for creating the left LLE 8 and the right side R will include the emitter for creating the right LLE 16. For simplicity, and unless otherwise stated, a left-to-right direction of travel of the light field between the nodes will be assumed hereinafter unless otherwise stated; the accompanying claims are not, however, to be interpreted as restricted to any particular direction of travel of the light field, or to the direction of travel being the same across different links, unless so stated or implicitly required.

In operation of the quantum repeater 30, after creation, in any order, of the left and right LLEs 8 and 16, a local merge operation 34 involving the qubits qb2 and qb4 is effected thereby to merge the left LLE 8 and the right LLE 16 and form extended entanglement 19 between the qubits qb1 and qb5 in the end nodes 31 and 32 respectively.

If required, information about the success or otherwise of the merge operation and about parity is passed in classical messages 35 from the quantum repeater 30 to the nodes 31, 32.

Regarding the parity information, where the parity of the local link entanglements has been standardized, (by qubit state flipping as required), only the merge parity information needs to be passed on by the quantum repeater and either node 31 or 32 can make use of this information. However, where LLE parity information has simply been stored, then the quantum repeater needs to pass on whatever parity information it possesses; for example, where the parities of the left and right LLEs 8, 16 are respectively known by the quantum repeater 30 and the node 32, the quantum repeater 30 needs to pass on to node 32 both the parity information on LLE 8 and the merge parity information, typically after combining the two. Node 32 can now determine the parity of the extended entanglement by combining the parity information it receives from the quantum repeater 30 with the parity information it already knows about LLE 16.

From the foregoing, it can be seen that although the merge operation itself is very rapid (of the order of $10^{-9}$ seconds), there is generally a delay corresponding to the message propagation time to the furthest one of the nodes 31, 32 before the extended entanglement 19 is usefully available to these nodes.

By chaining together multiple quantum repeaters, it is possible to create an extended entanglement between any arbitrarily spaced pair of nodes. FIG. 3B illustrates this for a chain of N nodes comprising left and right end nodes 31 and 32 respectively, and a series of (N−2) quantum repeaters 30 (each labeled "QR" and diagrammatically depicted for simplicity as a rectangle with two circles that represent L and R qubits). The nodes 30-32 are interconnected into a chain by optical fibres (not shown) and are numbered from left to right—the number n of each node is given beneath each node and node number "j" represents an arbitrary QR node 30 along the chain. The node number of a QR node can be used as a suffix to identify the node; thus "$QR_j$" is a reference to the quantum repeater node numbered j. This node representation, numbering and identification is used generally throughout the present specification.

In FIG. 3B, three existing entanglements 36, 37, and 38 are shown between qubits in respective node pairings; for convenience, when referring at a high level to entanglements along a chain of nodes, a particular entanglement will herein be identified by reference to the pair of nodes holding the qubits between which the entanglement exists, this reference taking the form of a two-element node-number tuple. Thus, entanglement 38, which is a local link entanglement LLE between qubits in the neighbouring nodes numbered (N−1) and N, is identifiable by the node number tuple {(N−1), N}. Entanglements 36 and 37 (shown by medium thick arcs in FIG. 3B) are extended entanglements existing between qubits in the node pairings and {1, j} and {j,(N−1)} respectively, these entanglements having been created by the merging of LLEs. To create an end-to-end (abbreviated herein to "E2E") entanglement between qubits in the left and right end nodes 31, 32 (see thick arc 39 in FIG. 3), entanglements 36 and 37 can first be merged by $QR_j$ with the resultant extended entanglement then being merged with LLE 38 by $QR_{(N-1)}$; alternatively, entanglements 37 and 38 can first be merged by $QR_{(N-1)}$ with the resultant extended entanglement then being merged with entanglement 36 by $QR_j$.

Entanglement Build Path

The "entanglement build path" (EBP) of an entanglement is the aggregate qubit-to-qubit path taken by the mediating light field or fields used in the creation of an un-extended or extended entanglement; where there are multiple path segments (that is, the path involves more than two qubits), the light fields do not necessarily traverse their respective segments in sequence as will be apparent from a consideration of how the FIG. 3B E2E entanglement is built (in this example, the entanglement build path is the path from one end node to the other via the left and right side qubits of the chain of quantum repeaters).

Representation of Low Level Quantum Physical Hardware

The particular form of physical implementation of a qubit and the details of the methods of performing entanglement, elongate, and merge operations (for example, whether very weak amounts of light or laser pulses of many photons are used) are not of direct relevance to the present invention and accordingly will not be further described herein, it being understood that appropriate implementations will be known to persons skilled, in the art. Instead, the physical hardware for implementing the quantum operations (the "quantum physical hardware") will be represented in terms of a basic block, herein called a "Q-block", that provides for the implementation of, and interaction with, one qubit, and an associated optical fabric.

Figure 4:
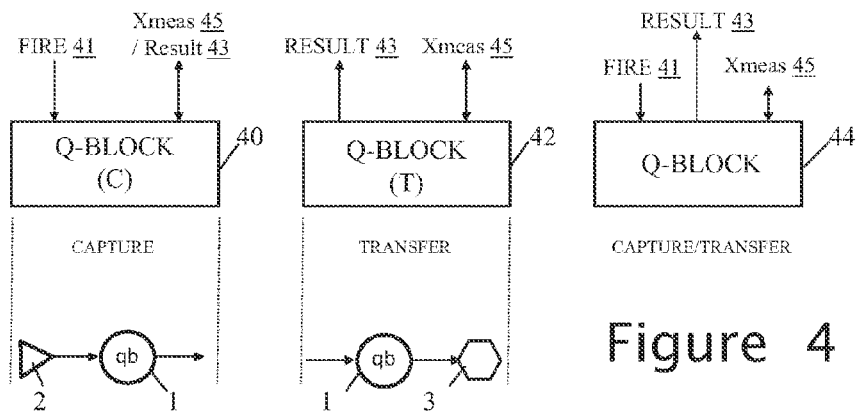
FIG. 4 is a diagram illustrating three varieties of a basic quantum physical hardware block, herein a "Q-block", for carrying out various quantum interactions.

FIG. 4 depicts three varieties of Q-block, respectively referenced 40, 42 and 44.

Q-block variety 40 represents the physical hardware needed to manifest a qubit and carry out the "Capture" interaction of FIG. 1A with that qubit, that is, the controlled sending of a light field through the qubit in a prepared state. This variety of Q-block—herein called "a Capture Q-block" (abbreviated in the drawings to "Q-block (C)")—comprises a physical implementation of a qubit 10 and a light-field emitter 12, together with appropriate optical plumbing, functionality for putting the qubit in a prepared state and for shuttering it (for example, using an electro-optical shutter) except when a light field is to be admitted, functionality (where appropriate for the qubit implementation concerned) for transferring the qubit state between electron spin and nuclear spin (and vice versa) as needed, and control functionality for coordinating the operation of the Capture Q-block to send a light field through its qubit (and on out of the Q-block) upon receipt of a "Fire" signal 41.

Q-block variety 42 represents the physical hardware needed, to manifest a qubit and carry out the "Transfer" interaction of FIG. 1A with that qubit, that is, the passing of a received light field through the qubit in a prepared state followed by measurement of the light field. This variety of Q-block—herein called "a Transfer Q-block" (abbreviated in the drawings to "Q-block (T)")—comprises a physical implementation of a qubit 10 and a light-field detector 13, together with appropriate optical plumbing, functionality (responsive, for example to a herald light pulse 6) for putting the qubit in a prepared state and for shuttering it except when a light field is to be admitted, functionality (where appropriate for the qubit implementation concerned) for transferring the qubit state between electron spin and nuclear spin (and vice versa) as needed, and control functionality for coordinating the operation of the Transfer Q-block and for outputting the measurement results 43.

Q-block variety 44 is a universal form of Q-block that incorporates the functionality of both of the Capture and Transfer Q-block varieties 40 and 42 and so can be used to effect both Capture and Transfer interactions. For convenience, this Q-Block variety is referred, to herein simply as a "Q-block" without any qualifying letter and unless some specific point is being made about the use of a Capture or Transfer Q-block 40, 42, this is the variety of Q-block that will be generally be referred to even though it may not in fact be necessary for the Q-block to include both Capture and Transfer interaction functionality in the context concerned— persons skilled in the art will have no difficulty in recognizing such cases and in discerning whether Capture or Transfer interaction functionality is required by the Q-block in its context. One reason not to be more specific about whether a Q-block is of a Capture or Transfer variety is that often either variety could be used, provided, that a cooperating Q-block is of the other variety (the direction of travel of light fields between them not being critical).

Regardless of variety, every Q-block will be taken to include functionality for carrying out an X measurement in response to receipt of an Xmeas signal 45 thereby enabling the Q-block to be used in elongate and merge operations; the X measurement result is provided in the Result signal 43, it being appreciated that where the Q-block has Transfer interaction functionality, the X measurement functionality will typically use the detector 2 associated with the Transfer interaction functionality. X measurement functionality is not, of course, needed for an entanglement operation and could therefore be omitted from Q-blocks used only for such operations.

It may be noted that where there are multiple Q-blocks in a node, the opportunity exists to share certain components between Q-blocks (for example, where there are multiple Q-blocks with Capture interaction functionality, a common light-field emitter may be used for all such Q-blocks). Persons skilled in the art will appreciate when such component sharing is possible.

An entanglement operation will involve a Q-block with Capture interaction functionality (either a Transfer Q-block 40 or a universal Q-block 44) optically coupled to a Q-block with Transfer interaction functionality (either a Transfer Q-block 42 or a universal Q-block 44), the entanglement operation being initiated, by a Fire signal 41 sent to the Q-block with Capture interaction functionality and the success/failure of the operation being indicated in the result signal 43 output by the Q-block with Transfer interaction functionality.

Where an elongate operation is to be effected, the initial entanglement-operation component of the elongate operation will also involve a Q-block with Capture interaction functionality and a Q-block with Transfer interaction functionality. The provision of X measurement functionality in all varieties of Q-block enables the subsequent removal from entanglement of the intermediate qubit to be effected by sending an Xmeas signal to the Q-block implementing this qubit, the measurement results being provided in the result signals 43 output by this Q-block.

Where a merge operation is to be effected, this will also involve a Q-block with Capture interaction functionality and a Q-block with Transfer interaction functionality. Again, the provision of X measurement functionality in all varieties of Q-block enables the removal from entanglement of the qubit(s) involved in the merge operation. Measurement results are provided in the result signals 43 output by the appropriate Q-blocks.

Figure 5:
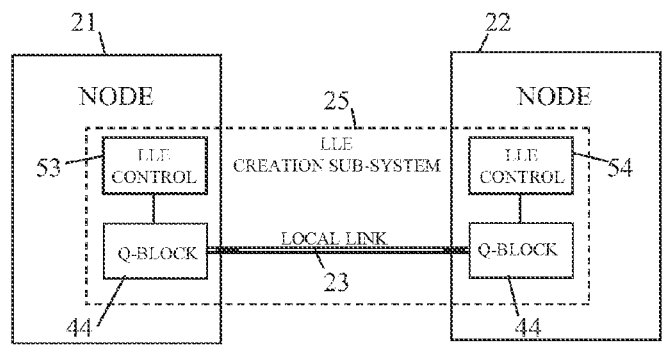
FIG. 5 is a diagram illustrating an implementation of the FIG. 2 entanglement creation subsystem using Q-blocks.

FIG. 5 depicts the FIG. 2 LLE creation subsystem 25 as implemented, using respective Q-blocks 44. A respective Q-block 44 is provided in each node 21 and 22, these Q-blocks 44 being optically coupled through the local link fibre 23. Each Q-block 44 has associated control logic formed by LLE control unit 53 in node 21 and LLE control unit 54 in node 54. 53, Because the Q-blocks 44 depicted in FIG. 5 are of the universal variety, the direction of travel along the local link fibre 23 of light fields involved in entanglement creation is not tied down; thus, the Q-block 44 of the node 21 could serve as a Capture Q-block and that of node 22 as a Transfer Q-block or the Q-block 44 of the node 21 could serve as a Transfer Q-block and that of node 51 as a Capture Q-block.

In the LLE creation subsystem 25 of FIG. 5, the single Q-blocks 44 are simply coupled directly to the local link fibre 23. However, in many cases there will be a need, to provide a controllable optical fabric in a node to appropriately guide light fields to/from the Q-block(s) of the node depending on its current operational requirements. For example, where there are multiple Q-blocks in a node sharing the same external fibre, an optical fabric may be required to merge outgoing light fields onto the common fibre or direct incoming light fields from the fibre to selected Q-blocks; in another example, an optical fabric may be required in a quantum repeater node (such as node 30 in FIG. 3A) to switch a L-side Q-block and a R-side Q-block from optically interfacing with respective left and right local link fibres for LLE creation, to optically interfacing with each other for a local merge operation.

Figure 6:
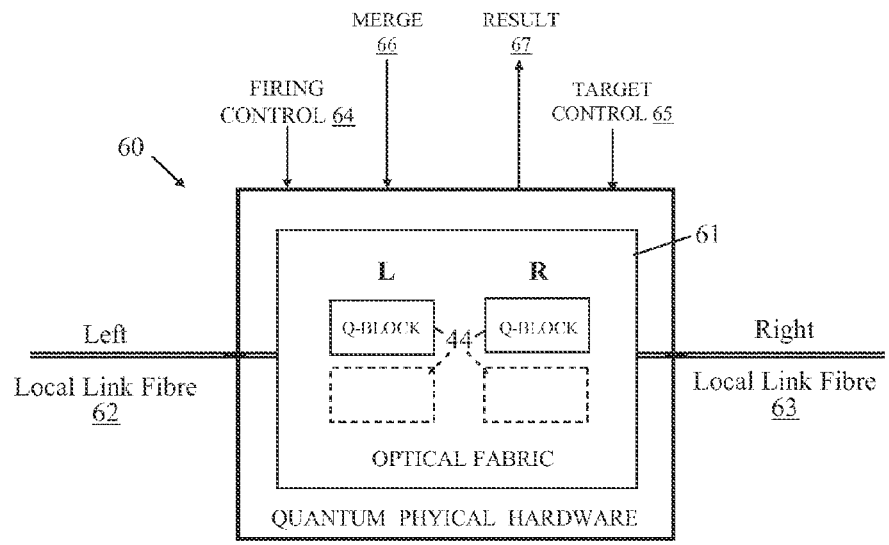
FIG. 6 is a generic diagram of quantum physical hardware of a quantum repeater.

In general terms, therefore, the quantum physical hardware of a node, that is, the physical elements that implement and support qubits and their interaction through light fields, comprises not only one or more Q-blocks but also an optical fabric in which the Q-block(s) are effectively embedded. By way of example, FIG. 6 depicts such a representation for a quantum repeater node; thus, quantum physical hardware 60 is shown as comprising an optical fabric 61 for guiding light fields to/from the Q-blocks 44 and the Q-blocks 44 are depicted as existing within the optical fabric 61 with the local link fibres 62, 63 coupling directly to the optical fabric. One L-side and one R-side Q-block are shown in solid outline and possible further L-side and R-side Q-blocks are indicated by respective dashed-outline Q-blocks.

As employed, herein, any instance of the above-described generalized quantum physical hardware representation, (such as the instance shown in FIG. 6 in respect of a quantum repeater), is intended to embrace all possible implementations of the quantum physical hardware concerned, appropriate for the number and varieties of Q-blocks involved and their intended roles. (It may be noted that although FIG. 6 shows the Q-blocks as Q-blocks 44—that is, of the Universal variety—this is simply to embrace all possible implementations and is not a requirement of the role being played by the Q-blocks in the quantum repeater; a particular implementation may use other varieties of Q-blocks as appropriate to their roles. This use of Q-blocks 44 in the above-described generalized quantum physical hardware representation is not limited to the FIG. 6 representation of quantum physical hardware for a quantum repeater).

Depending on the quantum operations to be performed by the quantum physical hardware, the latter is arranged to receive various control signals and to output result signals, In the case of the FIG. 6 quantum physical hardware block 60 appropriate for a quantum repeater, the quantum physical hardware is arranged to receive "Firing Control" and "Target Control" signals 64, 65 for controlling entanglement creation operations, to receive "Merge" signals 67 for controlling merge operations, and to output "Result" signals 66 indicative of the outcome of these operations. The signals 64-67 may be parameterized to indicate particular Q-blocks. Target Control signals are not needed in some quantum repeater embodiments as will become apparent hereinafter. In one implementation of the FIG. 6 quantum physical hardware 60, the Firing Control signals 64 comprise both:

set-up signals for appropriately configuring the optical fabric 61 (if not already so configured) to optically couple one or more Q-block(s) with Capture interaction functionality to one of the local link fibres, and the previously-mentioned "Fire" signal(s) for triggering light-field generation by one or more of the Q-block(s) with Capture interaction functionality;

and the Target Control signals 65 comprise:

set-up signals for appropriately configuring the optical fabric 61 (if not already so configured) to optically couple a Q-block with Transfer interaction functionality to one of the local link fibres.

Furthermore, in this implementation, the Merge signals 66 comprise both:

set-up signals for appropriately configuring the optical fabric 61 (if not already so configured) to effect a merge operation involving a L-side and R-side Q-block of the repeater, a "Fire" signal for triggering the first merge-operation process, and where the FIG. 1C form of merge operation is being carried out, one or more Xmeas signals to instigate the X measurements that form the second merge-operation process.

For quantum physical hardware intended to perform elongate operations, the quantum physical hardware, as well as being arranged to receive Firing Control signals (for performing the entanglement creation component of the elongate operation) and to output Result signals, is also arranged, to receive Xmeas signals for instigating X measurements whereby to complete the elongate operation.

The optical fabric of a node may have a default configuration. For example, where the FIG. 6 quantum physical hardware 60 only includes one L-side and one R-side Q-block, the optical fabric 61 may be arranged to default to an LLE, creation configuration optically coupling the Q-blocks to respective ones of the local link fibres. In this case, the merge signals 66 are arranged to only temporarily optically couple the two Q-blocks to each other for the time needed to carry out a merge operation. In cases such as this, the Target Control signals 65 can be dispensed, with entirely and the Firing Control signals 64 simply comprise Fire signals sent to the appropriate Q-block.

FIGS. 7A, 7B, 7C and 7D show example implementations of the quantum physical hardware 60, and in particular of the optical fabric 61, for particular Q-block set ups in a quantum repeater with left and right local link fibres 62, 63. In these Figures, the directions of travel of light fields along optical fibres are indicated by arrows.

Figure 7A:
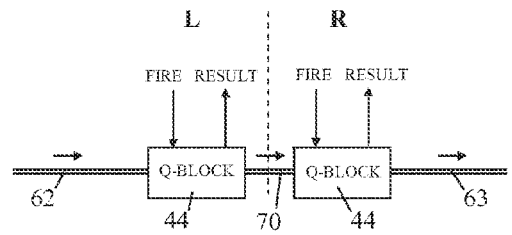
FIG. 7A to 7D show respective example implementations of the FIG. 6 quantum physical hardware.

The FIG. 7A implementation is applicable to the case of a quantum repeater with one L-side Q-block and one R-side Q-block; in this implementation both Q-blocks are universal Q-blocks 44. The left local link fibre 62 couples directly to the input of the L-side Q-block 44, and the right local link fibre 63 couples directly to the output of the R-side Q-block 44. The output of the L-side Q-block is coupled to the input of the R-side Q-block 44 by a short optical fibre 70. For LLE creation operation, the L-side Q-block 44 is operated as a Transfer Q-block receiving a light field along local link fibre 62, and the R-side Q-block 44 is operated as a Capture Q-block sending a light field, after passage through its qubit, out along local link fibre 63. To carry out a merge operation between the Q-blocks 44, the L-side Q-block 44 is operated as a Capture Q-block sending a light field, after passage through its qubit, along the optical fibre 70 to the R-side Q-block, now operated as a Transfer Q-block. The set-up signals of the Firing Control, Target Control, and Merge signals 64, 65, 66 configure the optical fabric 61 to ensure that the Q-blocks as appropriate for the LLE creation/merge operation to be performed.

Figure 7B:
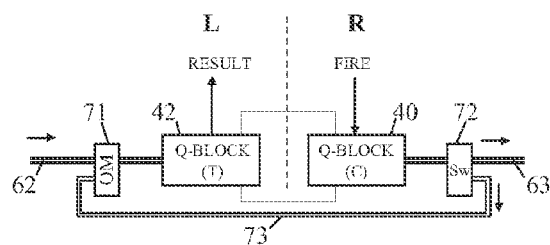

The FIG. 7B implementation is also applicable to the case of a quantum repeater with one L-side Q-block 44 and one R-side Q-block 44: in this implementation the L-side Q-block is a Transfer Q-block 42 and the R-side Q-block is a Capture Q-block 40. An active optical switch 72 enables a light field from the R-side Capture Q-block 40 to be selectively optically coupled either to the right local link fibre 63 (when a LLE creation operation is to be carried out) or to a loop-back optical fibre 73 (when a merge operation is to be carried out). A passive optical merge unit 71 enables the L-side Transfer Q-block 42 to receive light fields coming in over either the left link fibre 62 or the loop-back optical fibre 73. The optical switch 72 is set in dependence on the set-up signals of the Firing Control and Merge signals 64, 65, 66 (this is another example of where the Target Control signals can be dispensed with entirely—in this case because the Firing Control set-up signals are adequate to appropriately configure the optical fabric for LLE creation).

Figure 7C:
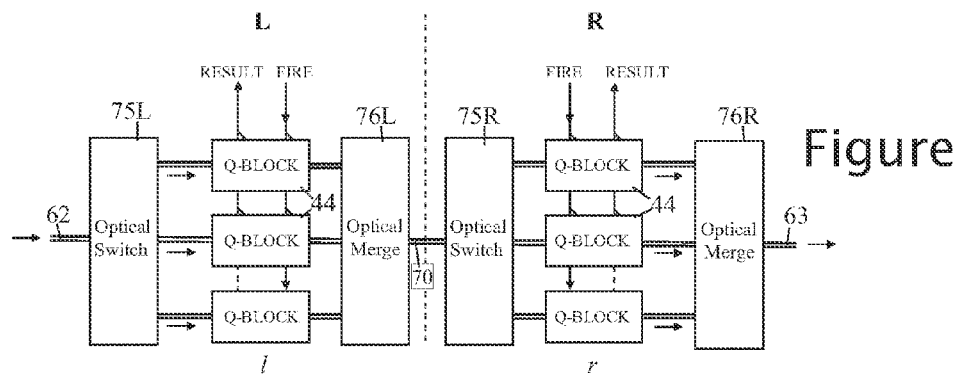

The FIG. 7C implementation is applicable to the case of a quantum repeater with multiple L-side universal Q-blocks 44 (genetically/in number) and multiple R-side universal Q-blocks 44 (generically r in number). In this case, an active optical switch 75L interfaces the left local link fibre 62 with the inputs of the L-side Q-blocks 44 and a passive optical merge unit 76L puts the outputs of the L-side Q-blocks 44 onto a single intermediate fibre 70. Similarly, an active optical switch 75R interfaces the intermediate fibre 70 with the inputs of the R-side Q-blocks 44 and a passive optical merge unit 76R puts the outputs of the R-side Q-blocks 44 onto the right local link fibre 63. For an LLE creation operation, the optical switch 75L switches a light field, coming in over the left link fibre 62 to a desired one of the L-side Q blocks 44, while the optical merge unit 76R couples the R-side Q-blocks 44 to the right local link fibre 63. For a merge operation, the optical merge unit 76L and the optical switch 75R enable any one of the L-side Q blocks 44 to be optically coupled to any desired one of the R-side Q-blocks 44.

Figure 7D:
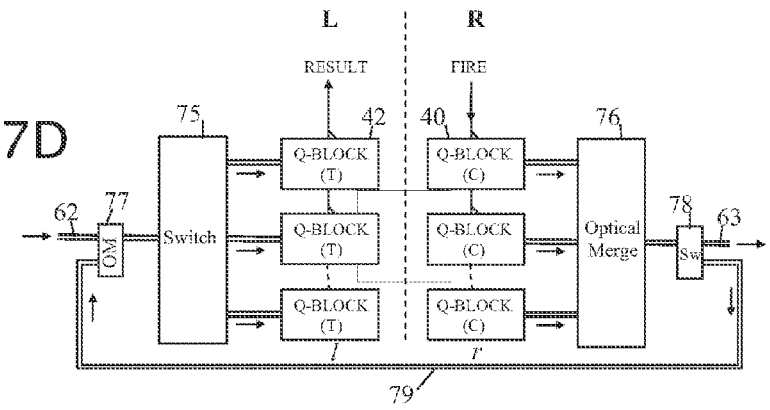

The FIG. 7D implementation is applicable to the case of a quantum repeater with multiple L-side Transfer Q-blocks 42 (l in number) and multiple R-side Capture Q-blocks 40 (r in number). In this case, a passive optical merge unit 76 puts the outputs of the R-side Capture Q-blocks 40 onto a single fibre which is then switched by an active optical switch 78 either to the right local link fibre 63 or to a loop-back optical fibre 79. An active optical switch 75, disposed in front of the L-side Transfer Q-blocks 42, is coupled to receive the output of a passive optical merge unit 77, the latter being coupled on its input side to the left local link fibre 62 and the loop-back optical fibre 79. The active optical switch 75 enables light fields received, from the optical merge unit 77 to be selectively passed, to a desired one of the L-side Transfer Q-blocks 42.

For an LLE creation operation, the optical switch 78 is set to feed the light field output by one or more of the R-side Capture Q-blocks 40 to the right local link fibre 63, and the optical switch 75 is set to feed, a light field, received over the left local link fibre 62 to a selected one of the Transfer Q-blocks 42 (the selected block being indicated in the Target Control set-up signals fed to the quantum physical hardware). For a merge operation, the optical switch 78 is set to feed the light field output by one of the R-side Capture Q-blocks 40 to the loop-back fibre 79 (the Q-block concerned will have been indicated in the Merge set-up signals fed to the quantum physical hardware), and the optical switch 75 is set to feed the light field received via the loop-back fibre 79 to a selected one of the Transfer Q-blocks 42 (again, the selected Q-block being indicated in the Merge set-up signals).

Of course, for both the FIGS. 7C and 7D quantum physical hardware implementations with l L-side Q-blocks and r R-side Q blocks, the value of l or r could be one in which case certain of the optical hardware elements (optical merges/switches) can be omitted.

General Form of Quantum Repeater Embodiments

Figure 8:
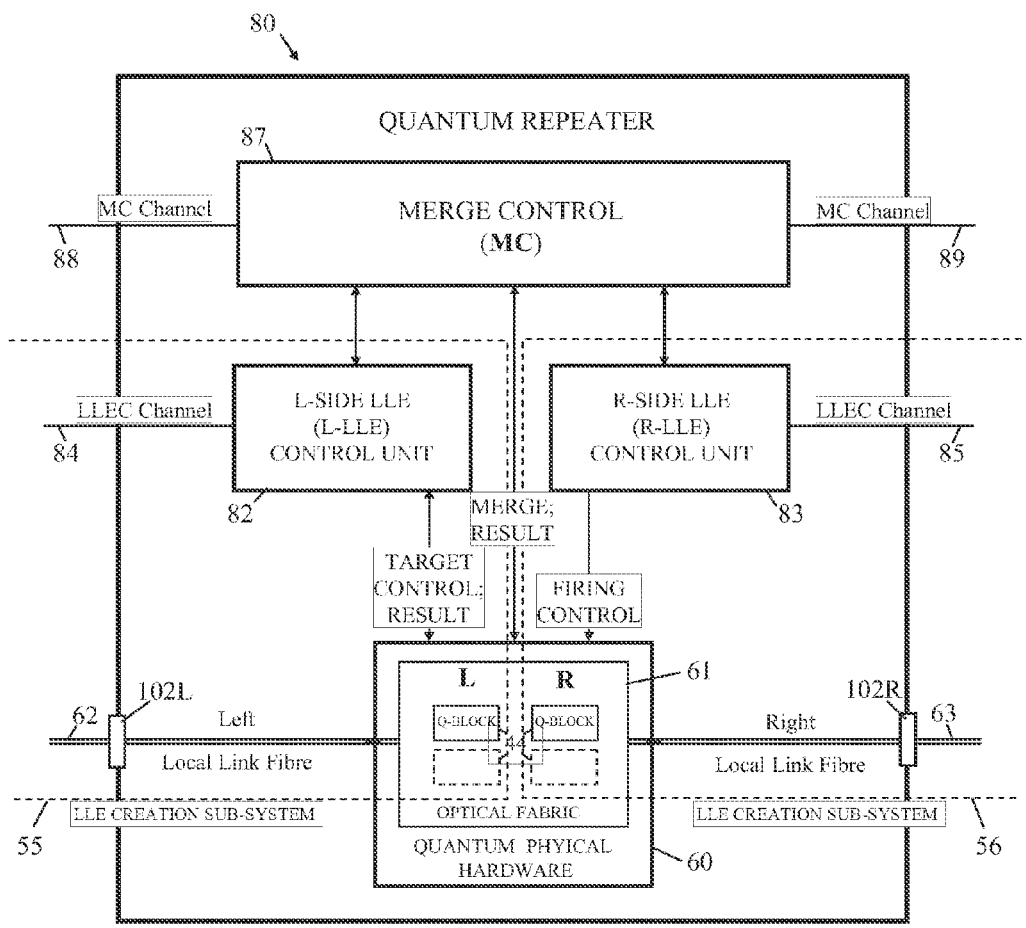
FIG. 8 is a diagram depicting the general form of the quantum repeater embodiments of the invention.

FIG. 8 depicts the general form of the quantum repeater embodiments to be described hereinafter.

More particularly, quantum repeater 80 comprises quantum physical hardware 60 of the form described above with respect to FIG. 6 and including one or more L-side and R-side Q-blocks 44, and optical fabric 61 coupled to left and right local link fibres 62, 63 via respective optical interfaces 102L, 102R. As already indicated, for convenience and without limitation, the light fields involved in LLE creation will be taken (unless otherwise stated) as travelling from left to right along the local link fibres between nodes, whereby the R-side Q-block(s) of the FIG. 8 repeater 80 act as Capture Q-block(s) during LLE creation (forming a right-side LLE creation subsystem 56 with L-side Q-block(s) in a right neighbour node, not shown), and the L-side Q-block(s) of the repeater 80 act as Transfer Q-block(s) during LLE creation (forming a left-side LLE creation subsystem 55 with R-side Q-block(s) in a left neighbour node, not shown).

An R-side LLE ("R-LLE") control unit 83 is responsible for generating the Firing Control signals that select (where appropriate) and trigger firing of the R-side Q-block(s) in respect of LLE creation. An L-side LLE ("L-LLE") control unit 82 is responsible for generating, where appropriate, the Target Control signals for selecting the L-side Q-block(s) to participate in LLE creation; the L-LLE control unit 82 is also arranged to receive the Result signals from the quantum physical hardware 60 indicative of the success/failure of the LLE creation operations involving the L-side Q-blocks.

It will thus be appreciated that initiation of right-side LLE creation is effectively under the control of the R-LLE control unit 83 of the repeater 80 (as unit 83 is responsible for generating the Fire signal for the R-side Q-block involved in creating the right-side LLE); initiation of left-side LLE creation is, however, effectively under the control of the R-LLE control unit in the left neighbour node.

An LLE control ("LLEC") classical communication channel 84 inter-communicates the L-LLE control unit 82 with the R-LLE control unit of the left neighbour node (that is, the R-LLE control unit associated with the same LLE creation subsystem 55 as the L-LLE control unit 82); the L-LLE control unit 82 uses the LLEC channel 84 to pass LLE creation success/failure messages (message 15 in FIG. 1) to the R-LLE control unit of the left neighbour node.

An LLE control ("LLEC") classical communication channel 85 inter-communicates the R-LLE control unit 83 with the L-LLE control unit of the right neighbour node (that is, the L-LLE control unit associated with the same LLE creation subsystem 56 as the R-LLE control unit 83); the R-LLE control unit 83 receives LLE creation success/failure messages (message 15 in FIG. 1) over the LLEC channel 85 from the L-LLE control unit of the right neighbour node.

Messages on the LLEC channels 84, 85 are referred to herein as 'LLEC' messages.

It will be appreciated that where the light fields involved in LLE creation are arranged to travel from right to left along the local link fibres between nodes (rather than from left to right), the roles of the L-side and R-side LLE control units 82, 83 are reversed.

A merge control ("MC") unit 87 is responsible for generating the Merge signals that select, where appropriate, local Q-blocks to be merged, and trigger their merging. The MC unit 87 is also arranged to receive from the quantum physical hardware 60, the Result signals indicative of the success/failure and parity of a merge operation.

A merge control ("MC") classical communication channel 88, 89 inter-communicates the MC unit 87 with corresponding units of its left and right neighbour nodes to enable the passing of parity information and, if needed, success/failure information concerning merge operations. Messages on the MC channels 88, 89 are referred to herein as 'MC' messages.

The LLEC communication channel 84, 85 and the MC communication channel 88, 89 can be provided over any suitable high-speed communication connections (such as radio) but are preferably earned as optical signals over optical fibres. More particularly, the LLEC communication channel 84, 85 and the MC communication channel 88, 89 can be carried over respective dedicated optical fibres or multiplexed onto the same fibre (which could be the fibre used for the local links optically coupling Q-blocks in neighbouring nodes—for example, the MC communication channel can be implemented as intensity modulations of the herald signal 79, particularly where only parity information is being sent on this channel). More generally, the LLEC and MC communication channels can be combined into a single duplex classical communications channel.

In the embodiments described hereinafter, the LLEC communication channel 84, 85 is carried by the local link fibres and the MC communication channel 88, 89 is split into a left-to-right ("LR") channel and a right-to-left ("RL") channel, these two MC channels being carried by respective optical fibres distinct from that used for the local links. Messages on the LR MC channel and the RL MC channel are respectively referred to herein as 'LR-MC' messages and 'RL-MC' messages. It will be appreciated, that this arrangement of channels and fibres is merely exemplary and other arrangements could, alternatively be used.

It may be noted that the end nodes linked by a chain of quantum repeaters will each contain functionality for inter-working with the facing side (L or R) of the neighbouring quantum repeater. Thus, the left end node will include functionality similar to that of the R-side of a quantum repeater thereby enabling the left end node to inter-work with the L-side of the neighbouring repeater, and the right end node will include functionality similar to that of the L-side of a quantum repeater to enable the right end node to inter-work with the R-side of the neighbouring repeater.

With regard to entanglement parity, in the embodiments described below, rather than the parity of entanglements being standardized by qubit state flipping, at each quantum repeater LLE parity information is stored and subsequently combined with merge parity information for passing on along cumulatively to an end node thereby to enable the latter to determine the parity of end-to-end entanglements.

In the following description of the quantum repeater embodiments, the same reference numerals are used for the main repeater components as are used in the generic diagram of FIG. 8, it being understood that the specific implementations of these components will generally differ.

"Extend-from-End" Quantum Repeater Embodiments

Figure 9:
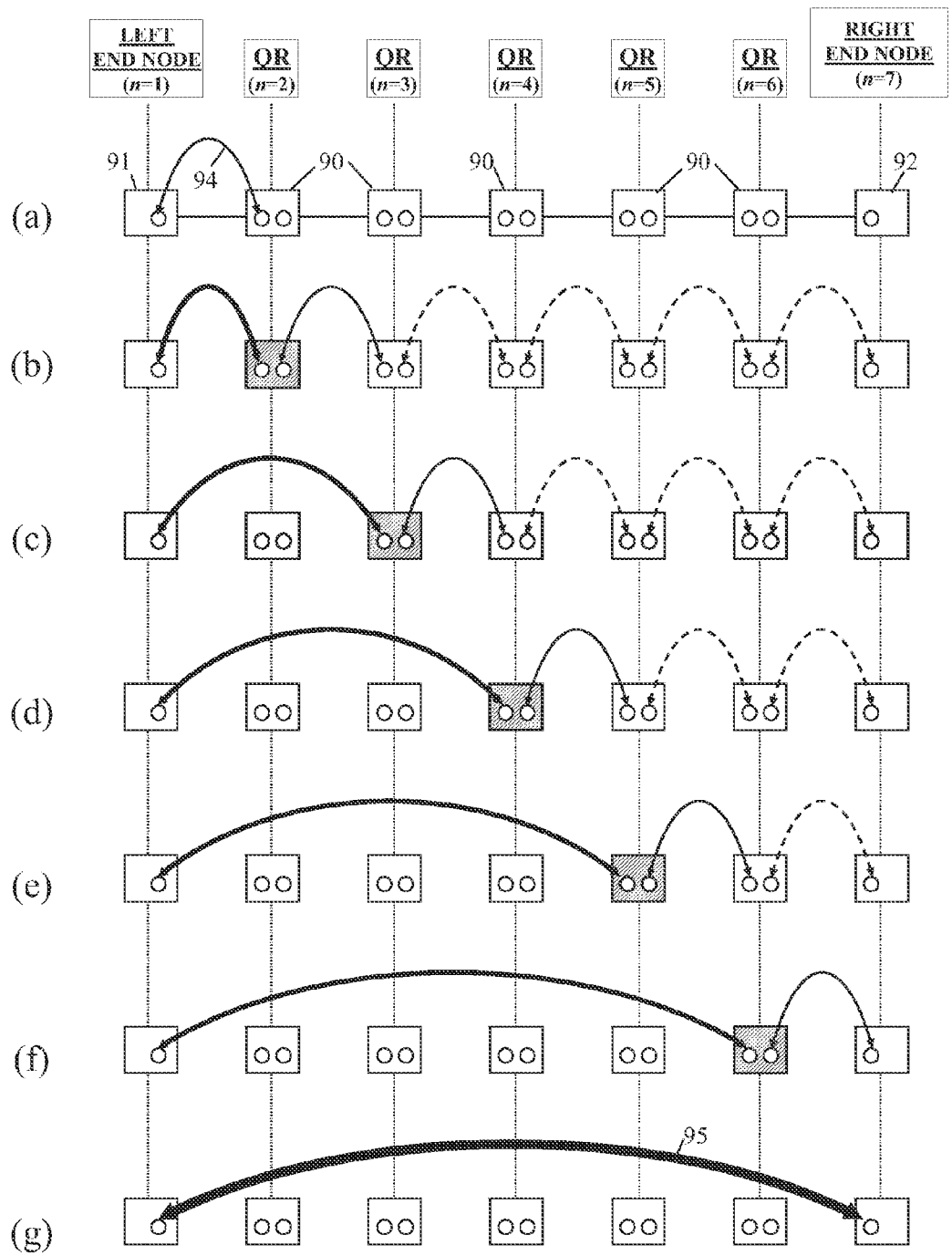
FIG. 9 illustrates an iterative process embodying the invention for building an E2E entanglement from the left end of an example chain of seven nodes.
Figure 10:
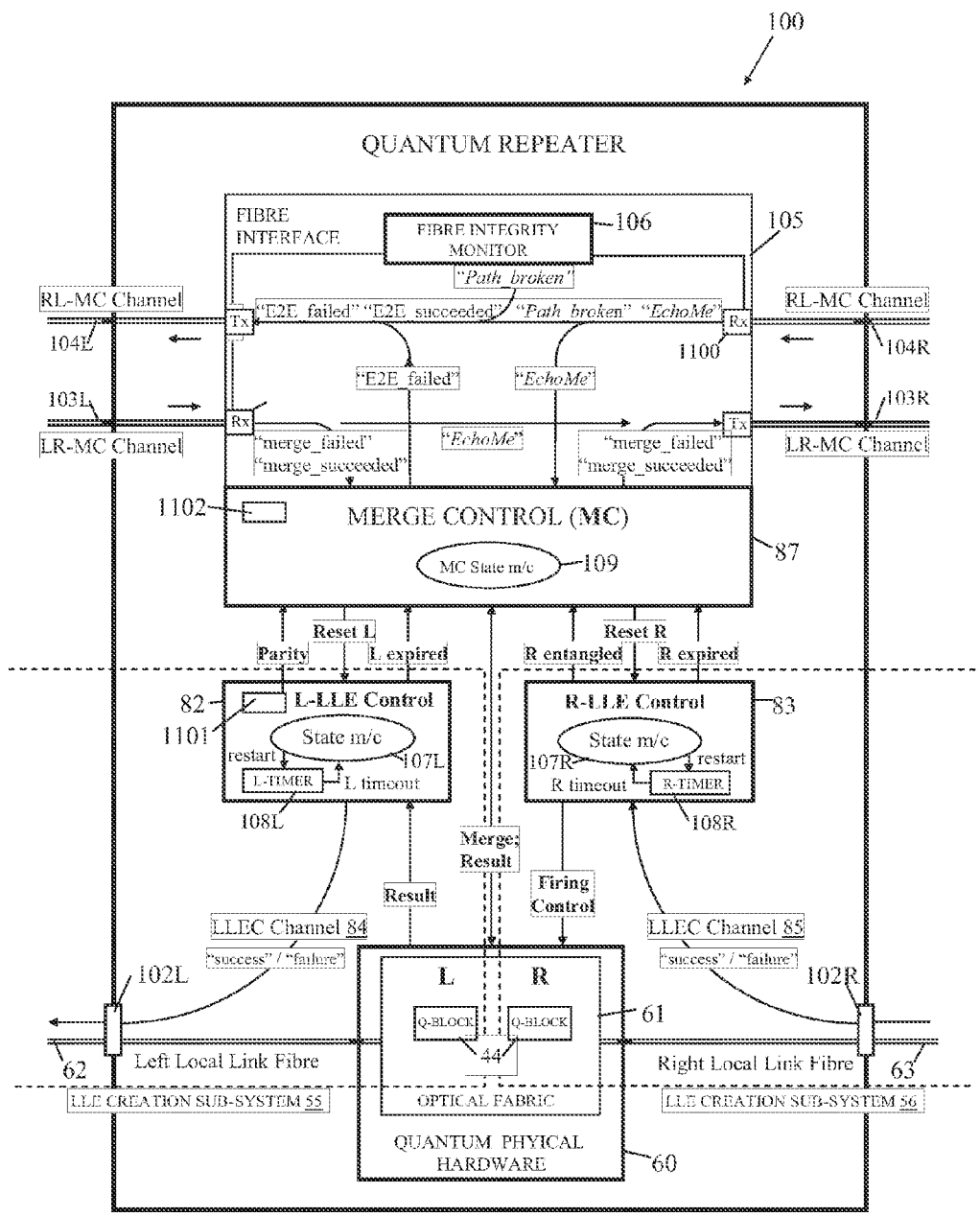
FIG. 10 is a diagram of a first quantum-repeater embodiment.
Figure 24:
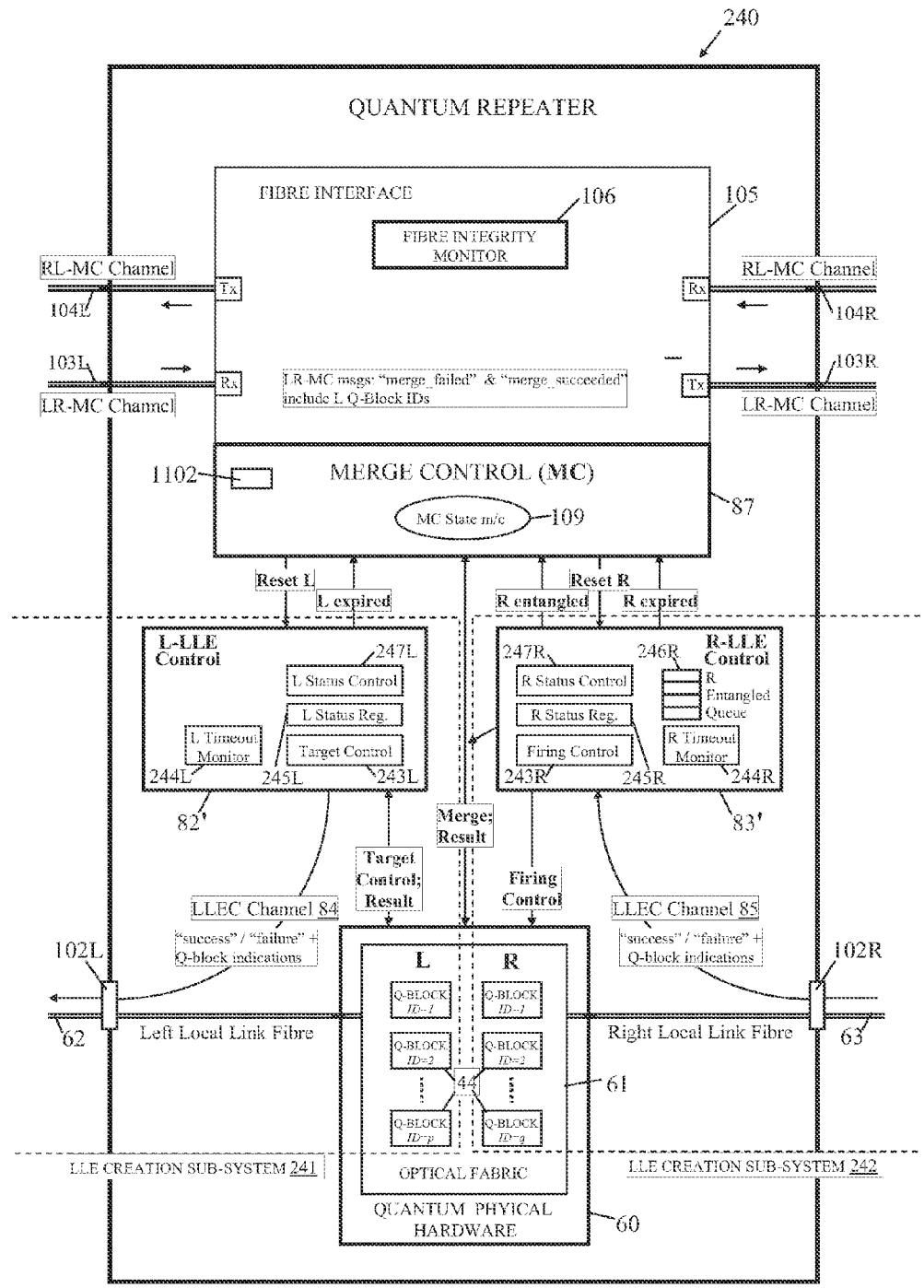
FIG. 24 is a diagram of a second quantum-repeater embodiment.

The first and second quantum repeater embodiments, illustrated in FIGS. 10 and 24 respectively, both operate on an "Extend-from-End" basis to build an end-to-end (E2E) entanglement between qubits in left and right end nodes of a chain of nodes whose intermediate nodes are quantum repeaters. Building an E2E entanglement on the "Extend-from-End" basis involves an iterative process, starting with an LLE between a first one of the end nodes and the neighbouring quantum repeater, of extending an entanglement existing between the first end node and a quantum repeater of the chain of nodes by merging that entanglement with an LLE formed between that repeater and its neighbour node on the side away from the first end node. This iterative process is illustrated in FIGS. 9 (*a*) to (*g*) for building an E2E entanglement from the left end of an example chain of seven nodes; this chain comprises left and right end nodes 91, 92 respectively and five intermediate quantum repeater (QR) nodes 90 (the local link fibres that optically couple the nodes are only shown in FIG. 9 (*a*) to avoid unnecessarily cluttering the Figure). The node representation, node numbering n and repeater identification $QR_n$ used, in respect of FIG. 9 are the same as used for FIG. 3; in particular, n=1 and n=7 for the left and right end nodes respectively of FIG. 9. Arrow arcs between nodes represent entanglements, those in solid lines being pertinent to the "Extend-from-End" process of building an E2E entanglement whereas those shown in dashed lines are incidental LLEs.

FIG. 9 (*a*) illustrates an initial state where an LLE 94 has already been created between the left end node 91 and the neighbour quantum repeater $QR_2$ 90.

Each of FIGS. 9 (*b*) to (*f*) represents a respective entanglement-extending iteration of the "Extend-from-End" process with the entanglement to be extended in the iteration concerned being shown as a medium thick arc, and the operative quantum repeater (that is, the one that is to effect the entanglement-extending merge) being shown hatched. In FIGS. 9(*b*) to (*f*), each iteration is depicted just prior to the operative quantum repeater effecting its merge operation.

FIG. 9 (*g*) showing the E2E entanglement 95 (thick arched arrow) resulting from the final entanglement-extending iteration of FIG. 9(*f*).

The LLEs used in the "Extend-from-End" process are for example, created on an on-going basis by the quantum repeaters 90, whereby an LLE extending to the right from the operative quantum repeater will exist, or shortly exist, when needed by that repeater, notwithstanding the limited, lifetime of an entanglement: the dashed-line LLEs are ones created by the quantum repeaters as part of such an ongoing LLE creation process but before they are actually needed.

Although the "Extend-from-End" process illustrated in FIG. 9 builds an E2E entanglement from the left end node 91 to the right end node 92, it will be appreciated that the same general process can be applied to build an E2E entanglement from the right end node 92 to the left end node 91.

For simplicity of explanation, it is assumed, in FIG. 9 that all merges are successful; if a merge fails, the whole "Extend-from-End" process is re-started.

A number of generic features may be noted about the "Extend-from-End" process illustrated, in FIG. 9. In particular:

for each iteration, the operative quantum repeater (the one effecting the entanglement-extending merge) shifts by one along the chain of nodes away from the left end node (that is, away from the end node anchoring the entanglement being extended).

before carrying out its merge operation, the operative quantum repeater needs to know that both the following conditions have been met:

its left neighbour repeater (the one towards the end node anchoring the entanglement being extended) has successfully carried out its merge operation thereby extending the entanglement anchored by the left end node to the quantum repeater (in fact, receipt of this information by a repeater effectively tells it that it is now the operative repeater);

an LLE exists between the repeater and its right neighbour node (the one away from the end node anchoring the entanglement being extended).

When both conditions are met, the operative quantum repeater can carry out a merge operation to further extend the entanglement anchored at the left end node; after successfully effecting the merge, the repeater notifies its right neighbour node (the one away from the end node anchoring the entanglement being extended) which then becomes the operative repeater. The "successful merge" notification sent to the right neighbour node is, in effect an operative-repeater "token"—this token is progressively passed, along the node chain with the current recipient being the operative repeater until it, in turn, passes on the token. Arrival of the token at the right end node marks completion of the iterative entanglement extension process.

First "Extend-from-End" Quantum Repeater Embodiment (FIG. 10)

The first "Extend-from-End" quantum repeater embodiment will now be described, with reference to FIG. 10, it being understood that the quantum repeater operates in the context of being an intermediate node in a chain of nodes (such as depicted in FIG. 9) between the left and right end nodes of which E2E entanglements are to be created.

The quantum physical hardware 60 of the FIG. 10 quantum repeater 100 comprises an optical fabric 61 that services a single L-side Q-block 44 and a single R-side Q-block 44, and optically couples with left and right local link fibres 62, 63 respectively.

As already generally described in connection with FIG. 8, for LLE creation, the R-side Q-block of quantum repeater 100 operates as a Capture Q-block sending a light field through its qubit and out over the right local link fibre 63 to a L-side Q-block, operating as a Transfer Q-block, of the right-neighbour-node; the R-side Q-block of the quantum repeater 100 forms together with the L-side Q-block of the right neighbour node, an LLE creation subsystem 56. The L-side Q-block of quantum repeater 100 operates as a Transfer Q-block receiving a light field via the left local link fibre 63 from a left-neighbour-node Transfer Q-block with which it forms an LLE creation subsystem 55. The L-side and R-side Q-blocks are managed, in respect of LLE creation by left and right LLE control units 82 and 83 respectively (that is, L-LLE control unit 82 and R-LLE control unit 83). The R-LLE control unit 83 is responsible for generating the Firing Control signals; however, the L-LLE control unit 82 is not required to generate Target Control signals in the present embodiment. Result signals in respect of LLE creation are passed from the L-side Q-block to the L-LLE unit 82. The left LLEC channel 84 is imposed on the left local link fibre 62 via optical interface 102L and used to pass LLE creation "success/failure" messages from the L-LLE control unit 82 to the R-LLE control unit of the left neighbour node. Similarly, the right LLEC channel 85 is imposed on the right local link fibre 63 via optical interface 102R and is used to pass to the R-LLE control unit 83 LLE creation "success/failure" messages from the L-LLE control unit of the right neighbour node.

Merge control is effected by merge control (MC) unit 87 which, as well as interfacing with the quantum physical hardware to initiate a merge operation and receive back result signals, is arranged to exchange various signals with the L-LLE control unit 82 and R-LLE control unit 83 and to communicate with the merge control units of other nodes by messages sent over a left-to-right merge control (LR-MC) channel carried on left and right optical fibres 103L and 103R respectively, and a right-to-left merge control (RL-MC) channel carried on left and right optical fibres 104L and 104R respectively. A fibre interface unit 105 of the MC unit 87 not only provides transmit (Tx) and receive (Rx) interfaces for coupling with the fibres 103, 104, but also triages messages received over the fibres to pass them along the same channel and/or provide them to the main part of the MC unit 87. The fibre interface 105 also includes a fibre integrity monitor 106 the purpose of which will be explained later.

LLE Creation Control

A more detailed description will next be given of LLE creation. As noted when discussing the FIG. 8 generic repeater, initiation of right-side LLE creation is under the control of the R-LLE control unit 83 of a repeater whereas initiation of left-side LLE creation is under the control of the R-LLE control unit in the left neighbour node. As will be more fully described below, the R-LLE control unit 83 of repeater 100 is arranged to cause creation of right-side LLEs to be done on a minimum-delay regeneration basis, that is, as soon as a right-side LLE is used in a merge operation or ceases to be usable because the state of one (or both) of its qubits has decayed too far, a new right-side LLE creation operation is initiated. This serves to maximize the likelihood of a right-side LLE being present when the repeater 100 becomes the operative repeater (in terms of the "Extend-from End" process described above with respect to FIG. 9). Alternative strategies for creating right-side LLEs are possible, for example, only initiate right-side LLE generation when the repeater becomes the operative repeater. The role of the L-LLE control unit 82 of repeater 100 is more passive, involving reporting the success or failure of LLE creation.

The functioning of the LLE control units 82, 83 will be explained in terms of the operation of respective controlling state machines 107L, 107R and associated, timers 108L and 108R.

The timers 108L, 108R are used to track the useful lifetimes of the qubits of the L-side and R-side Q-blocks 44 respectively, each timer being reset and started by a 'restart' signal sent from the associated state machine 107L, 107R when a qubit is set up, and sending back a timeout signal ('L-timeout' or 'R-timeout' as appropriate) a fixed time later corresponding to the useful lifetime of a qubit.

Figure 11:
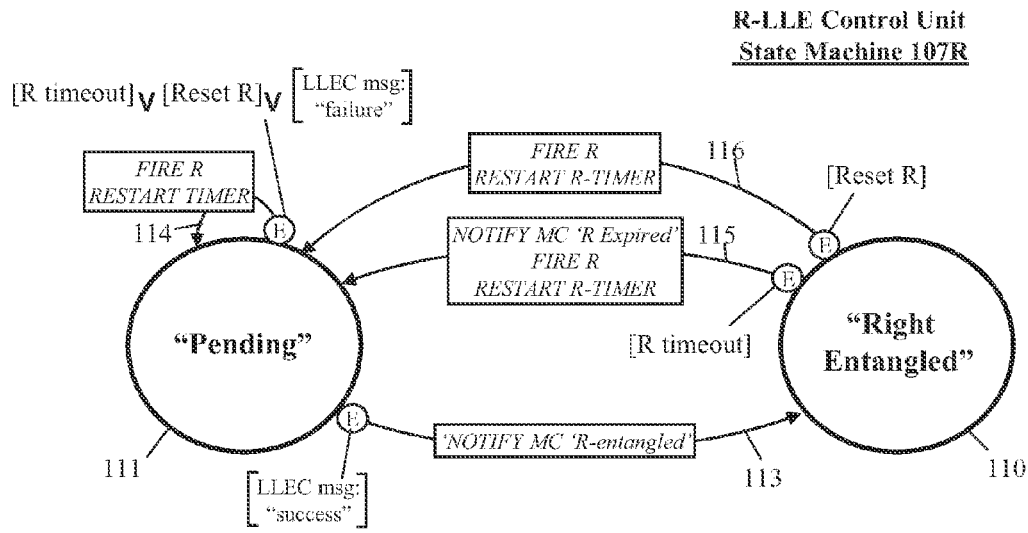
FIG. 11 is a state transition diagram of an example state machine implementation of a right-side local-link entanglement control unit of the FIG. 10 quantum repeater.
Figure 12:
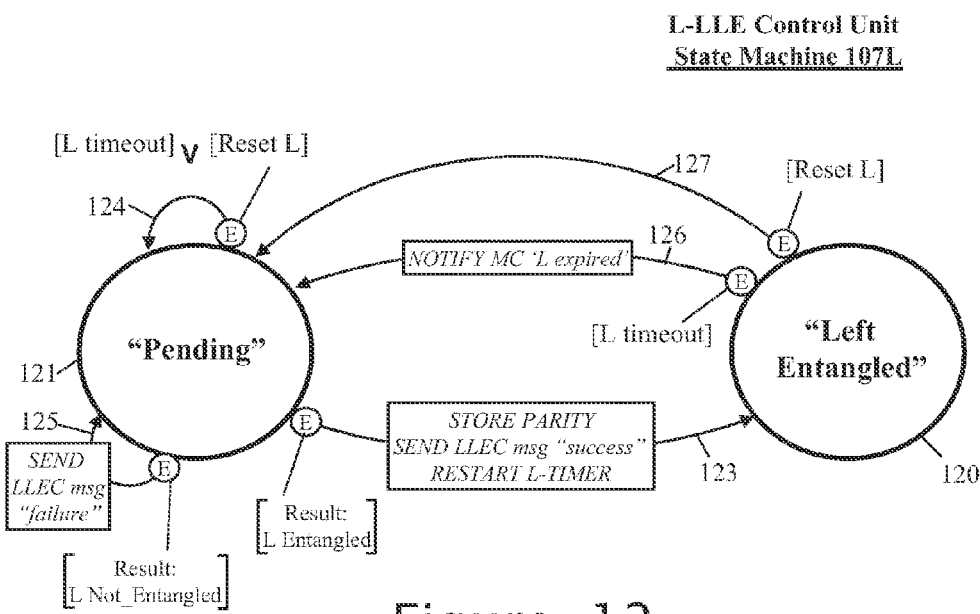
FIG. 12 is a state transition diagram of an example state machine implementation of a left-side local-link entanglement control unit of the FIG. 10 quantum repeater.

FIGS. 11 and 12 show state transition diagrams for the right and left LLE control unit state machines 107R, 107L respectively. In these state transition diagrams, states are shown by bold-edged circles, state transitions are shown by arrowed arcs, events that trigger transition from a state are indicated by circled 'E's and associated square-bracketed legends indicating the nature of the events concerned, and actions taken upon a state transition being triggered by an event are indicated in rectangular boxes placed on the relevant state transition arc.

Considering first the R-LLE control-unit state machine 107R (FIG. 11), this has two states, namely, a first state 110, labelled "Right Entangled", in which the state machine exists when the qubit of the R-side Q-Block is entangled, and a second state 111, labelled "Pending". The signals input to/output by the state machine 107R comprise:

Input
  'R-timeout' signals received from the timer 108R;
  right-side LLE creation 'success' and 'failure' LLEC messages received over the LLEC channel 85 from the right neighbour node; and
  a 'Reset R' signal received from the MC unit 87;

Output
  'Restart' signals sent to the timer 108R;
  a 'R expired' signal sent to the MC unit 87 upon the right-side LLE expiring as a result of timeout of the R-side qubit;
  the Firing Control signals sent to the quantum physical hardware 60; and
  a 'R entangled' signal output to the MC unit 87 to indicate the creation of a right-side LLE.

The input signals constitute events that trigger state transitions.

Whenever the state machine 107R receives a 'Reset R', an LLEC 'failure' message, or a 'R timeout' signal, it re-initiates right-side LLE creation by outputting appropriate Firing Control signals, (in this case, just the Fire signal), and restarts the associated timer 108R to start timing down the useful lifetime of the R-side qubit; these actions are labelled "FIRE R" and "RESTART R-TIMER" in FIG. 11. The state machine 107R will now be in its "Pending" state 111.

If a right-side LLE is successfully created, the state machine 107R will receive an LLEC 'success' message which causes it to transit from its 'Pending' state 110 to its 'Right Entangled' state 111 (see arc 113) with a 'R entangled' notification being sent to the MC unit 87. If right-side LLE creation is unsuccessful resulting in receipt of a LLEC 'fail' message, or if the useful lifetime of the R-side qubit times out resulting in receipt of a 'R-timeout' signal, or if a 'Reset R' signal is received from the MC unit 87, then right-side LLE creation is re-initiated (arc 114).

When the state machine 107R is in its "Right Entangled" state following successful right-side LLE creation, one of two relevant events may occur. Firstly, a 'R timeout' signal may be received from the timer 108R in which case right-side LLE creation must be re-initiated and the MC unit 87 notified, through a 'R expired' signal, that the right LLE has expired (arc 115). Secondly, a 'Reset R' signal may be received from the MC unit 87 (for example, as a result of a successful merge operation) in which case right-side LLE creation is re-initiated (arc 116). In either case, the state machine 107R returns to its "Pending" state 111.

Considering next the L-LLE control-unit state machine 107L (FIG. 12), this also has two states, namely, a first state 120, labelled "Left Entangled", in which the state machine exists when the qubit of the L-side Q-Block is entangled, and a second state 121, labelled "Pending". The signals input to/output by the state machine 107L comprise:

Input
'L-timeout' signals received from the timer 108L;
LLE-creation Result signals 'L Entangled' (including left LLE parity) and 'L Not_Entangled' received from the quantum physical hardware 60 to indicate whether or not the L-side qubit has been successfully entangled by a light field received, over the left link fibre; and
a 'Reset L' signal received from the MC unit 87;
Output
'Restart' signals sent to the timer 108L;
left-side LLE creation 'success' and 'failure' LLEC messages sent over the LLEC channel 84 to the left neighbour node; and
a 'L expired' signal sent to the MC unit 87 upon the left-side entanglement expiring as a result of time-out of the L-side qubit.

The input signals constitute events that trigger state transitions.

Whenever the state machine 107L, receives a 'Reset L' or a 'L timeout' signal, it will transit to its "Pending" state 121, if not already in this state. If now the state machine 107L receives a 'L Entangled' Result signal from the quantum physical hardware 60 telling it that the L-side qubit has been successfully entangled in a left-side LLE (initiated by its left neighbour node), the state machine 107L transits to its "Left Entangled" state 120 (arc 123). At the same time, the state machine 107L, stores in memory 1101 the left LLE parity information, sends a LLEC 'success' message to the left neighbour node, and restarts its associated timer 108L to start timing down the useful lifetime of the L-side qubit.

However, if when in its "Pending" state, the state machine 107L receives a 'L Not_Entangled' Result signal from the quantum physical hardware 60 telling it that a left-side LLE creation attempt (initiated by its left neighbour node) has failed, the state machine 107L sends a LLEC 'failure' message to the left neighbour node (arc 125) and remains in its "Pending" state 121. Receipt of a 'L timeout' signal or 'Reset L' signal by the state machine 107L when in its "Pending" state, simply results in the state machine 107L remaining in this state (arc 124).

When the state machine 107L is in its "Left Entangled" state following successful left-side LLE creation, one of two relevant events may occur. Firstly, a 'L timeout' signal may be received from the timer 108L in which case the MC unit 87 is notified, (through a 'L expired' signal) that the left LLE has expired, and the state machine 107L returns to its "Pending" state 121 (arc 126). Secondly, a 'Reset L' signal may be received from the MC unit 87 (for example, as a result of a successful merge operation) in which case the state machine 107R simply returns to its "Pending" state 121 (arc 127).

Merge Control

The functioning of the merge control (MC) unit 87 will next be explained in terms of the operation of a controlling state machine 109, reference being made to FIG. 13 which shows a state transition diagram for MC state machine 109. The same convention is used in FIG. 13 for representing state transitions, events and actions, as in FIGS. 11 and 12.

As noted above when discussing the "Extend-from-End" process illustrated in FIG. 9, before effecting a merge operation, a quantum repeater (such as repeater 100) implementing this process needs to know when the following two conditions are met:

(i) its left neighbour repeater has successfully carried out its merge operation thereby extending the entanglement anchored by the left end node to the quantum repeater, and (ii) an LLE exists between the repeater and its right neighbour node (the one away from the end node anchoring the entanglement being extended).

To track the fulfilment of these conditions, the MC state machine 109 has three states, namely, a first state 130, labelled. "Waiting", in which the state machine exists when neither condition is met, a second state 131, labelled "Merged To Left", in which the state machine exists when only the first condition is met, and a third state 132, labelled "Right Primed", in which the state machine exists when only the second condition is met.

The state machine 109 exchanges the following previously-mentioned signals with the lower level functions of the repeater (L-LLE and R-LLE control units 82,83, and the quantum physical hardware 60):

the 'Merge' control signals output to the quantum physical hardware 60 to initiate a merge, and the merge-operation 'Result' signals returned as input to the state machine 109;

the 'R entangled' signal input from the R-LLE control unit to indicate the creation of a right-side LLE;

the 'L expired' and 'R expired' signals input from the L-LLE and R-LLE control units 82, 83 as a result of timeout of left-side and right-side entanglement respectively; and the 'L Reset' and 'R Reset' signals output to the L-LLE and R-LLE control units 82, 83.

The state machine 109 also receives and sends the following messages over the merge control (MC) channel:

'merge_succeeded' and 'merge_failed' LR-MC messages input from the left neighbour node over the LR-MC Channel fibre 103L—the 'merge_succeeded' message effectively forms the previously mentioned "token" that is passed along the chain of nodes imparting operative-repeater status to its recipient whereby receipt of this message makes the current repeater the operative repeater;

'merge_succeeded' and 'merge_failed' LR-MC messages output towards the right neighbour node over the LR-MC Channel fibre 103R—the sending of a 'merge_succeeded' message (the operative-repeater token) effectively transfers operative repeater status to the right neighbour node;

an 'EchoMe' message input over the RL-MC Channel fibre 104R; and an 'E2E failed' message output over the RL-MC Channel fibre 104L to inform the left end node that the entanglement being extended from that node has failed.

The input signals received by the state machine 109 constitute events that trigger state transitions.

For present purposes the 'EchoMe' message can be considered as a general node reset signal—regardless of the current state of the MC state machine 109, receipt of the 'EchoMe' message causes it to transit to its "Waiting State" and send the 'Reset L' and 'Reset R' signals.

The basic operation of the MC state machine 109 is straightforward. When in its "Waiting state" 130 (for example, following receipt of an 'EchoMe' message), the state machine may either receive:

a 'merge succeeded' LR-MC message (a.k.a. the operative-node token) indicating that the entanglement anchored by the left end node has been successfully been extended to the quantum repeater, in which case the state machine 109 transits to its "Merged To Left" state 131 (arc 133);

an 'R entangled' signal indicating the creation of a right-side LLE, in which case the state machine transits to its "Right Primed" state 132 (arc 134);

If a 'L expired' signal is received when the state machine is in its "Merged To Left" state 131, it returns to its "Waiting" state 130 (arc 135) and sends the RL-MC message "E2E failed" to tell the left end node that the entanglement being extended from that node has failed—the failure in this case being due to the timeout of right-hand qubit of the entanglement, that is, the L-side qubit of the current repeater. If a 'R expired' signal is received when the state machine is in its "Right Primed" state 132, it simply returns to its "Waiting" state 130 (arc 136).

If a 'R entangled' signal is received when the state machine 109 is in its "Merged To Left" state 131, or a 'merge succeeded' LR-MC message received when the state machine is in its "Right Primed" state 132, both of the merge pre-conditions are fulfilled and the state machine 109, in transiting back to the "Waiting" state (arcs 137), sends a Merge signal to the quantum physical hardware 60 to initiate a merge operation, and reports the result of this operation to the nodes that need to know in LR-MC and RL-MC messages. If the merge was successful, the LR-MC message 'merge succeeded' is sent to the right neighbour node effectively passing it control (that is, that node, if not the end node, becomes the operative quantum repeater). If the merge was unsuccessful, the RL-MC message 'E2E failed' is sent so that the left end node knows the current entanglement extension process has failed; the LR-MC message 'merge failed' is also sent to the right neighbour node to cause the L-LLE control-unit state machine of that node to be reset to its "Pending" state.

Receipt by the MC state machine 109 of a LR-MC "merge failed" message when in its "Waiting" or "Right Primed" state 130, 132 results in the 'Reset L' signal being output to the L-LLE control-unit state machine to put it in its "Pending" state; the state of the MC state machine 109 is unchanged (arcs 138, 139).

Figure 13:
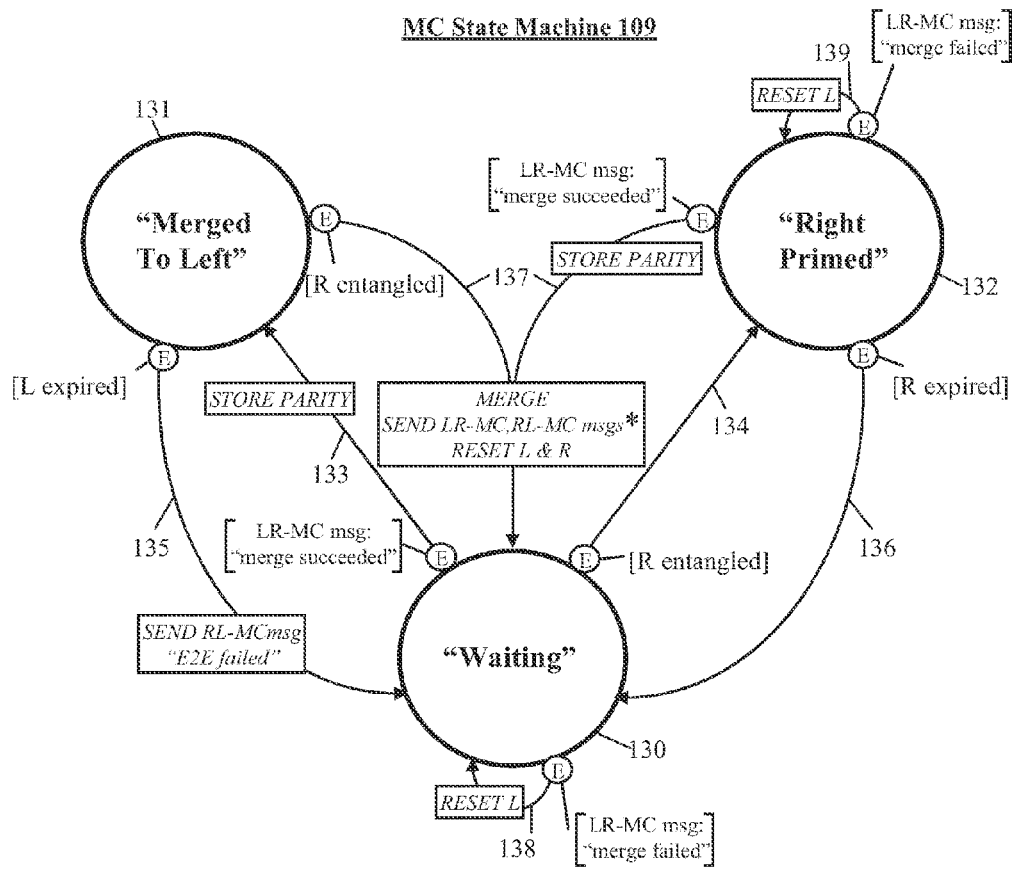
FIG. 13 is a state transition diagram of an example state machine implementation of a merge control unit of the FIG. 10 quantum repeater.

It will be appreciated that, strictly, a further state "Awaiting Merge Result" should have been included in the FIG. 13 state diagram, this state being entered after the Merge signal is sent and pending receipt of the merge-operation Result signal; the state has been omitted simply for reasons of clarity of explanation.

Regarding parity information, the LR-MC message 'merge successful' includes cumulative parity information. The MC state machine 109 is operative upon receipt of a LR-MC 'merge successful' message to temporarily store the cumulative parity information in memory 1102 (see actions on arcs 133 and 137). If the local merge operation subsequently carried out on arc 137 is successful, the MC state machine 109 combines the left LLE parity information held in store 1101 with:

(i) the cumulative parity information temporarily stored in memory 1102 (thereby notionally giving the parity of the entanglement extending from the left end node to the current repeater), and (ii) merge parity information for the successful merge just executed, thereby to produce updated cumulative parity information which the MC state machine 109 then includes in the LR-MC 'merge successful' message it sends.

Fibre Interface & MC Messages

As noted above, the fibre interface unit 105 of the MC unit 87 not only provides transmit (Tx) and receive (Rx) interfaces for coupling with the MC channel fibres 103, 104, but also triages LR and RL MC messages to pass them along the same channel and/or provide them to the MC state machine 109.

The MC messages can be grouped as follows:

The 'merge_succeeded' and 'merge_failed' LR-MC messages sent by the MC unit 87 of a repeater to the corresponding unit of its right neighbour.

The 'EchoMe' message which as already indicated serves as a general reset signal. The EchoMe message is initially generated by the left end node and is passed directly along LR-MC channel to the right end node; at the right end node the message is echoed back along the RL-MC channel, resetting the nodes along its way back to the left end node. This enables the left end node to smoothly start/re-start operation of the overall chain of nodes.

'E2E_failed' and 'E2E_succeeded' RL-MC messages passed, from right to left along the chain of nodes. The 'E2E_failed' message informs the left end node of the failure of a current entanglement extension operation; as already described, the 'E2E_failed' message may be generated by any repeater or the right end node. The 'E2E_succeeded' message is generated by the right end node to inform the left end node of the successful creation of an E2E entanglement.

A 'Path_broken' RL-MC message passed right to left. The generation and role of this message are explained below.

It will be appreciated that the role of certain of the foregoing messages (such as 'E2E_failed', 'E2E_succeeded') is not strictly merge control—nevertheless, all of the above messages are herein referred to as "MC messages".

The fibre interface unit 85 triages received LR-MC message to pass 'merge_succeeded' and 'merge-failed' messages to the MC state machine 109 and pass on 'EchoMe' messages along the LR-MC channel. The unit 85 also acts to insert 'merge_succeeded' and 'merge-failed' messages generated by the MC state machine 109 into the LR-MC channel.

The fibre interface unit 85 triages received RL-MC message to pass 'EchoMe' messages to the MC state machine 109 and pass on 'E2E_failed', 'E2E_succeeded', 'EchoMe' and 'Path_broken' messages along the RL-MC channel. The unit 85 also acts to insert 'E2E_failed' and 'Path_broken' messages into the RL-MC channel.

The fibre integrity monitor 106 of the fibre interface unit 105 is connected to the fibre receive (Rx) interfaces 1100 to detect loss of signal from the upstream nodes (the left neighbour node for the LR-MC channel, and the right neighbour node for the RL-MC channel) indicative of a fibre break in the interconnecting fibre. The signal monitored to detect this loss of signal is typically a continuously-present carrier signal used to carry the MC channel signals but could alternatively be a dedicated integrity-monitoring signal. On detecting a fibre break, the integrity monitor unit 106 outputs a 'Path_broken' signal. This enables the left end node to be rapidly informed of a failure of the fibre used for the MC messages.

Reversing Direction of Light Fields in LLE Creation

As already indicated, the terms "left" and "right" are simply convenient labels for relative directions along the node chain. The FIG. 10 embodiment could equally as well been described in terms of the light fields passing from right to left in the LLE creation subsystems (in which case, for LLE creation, the L-side Q-blocks need Capture interaction functionality and the R-side Q-blocks need Transfer interaction functionality) and E2E entanglements being built from the right end node.

A more interesting case is to reverse the direction of travel of the light fields involved in LLE creation (to be right-to-left) while still building E2E entanglements from the left end node. In fact, only small changes are needed to the right and left LLE control-unit state machines 107L, 107R to accommodate this case:

The L-LLE control-unit state machine 107L of FIG. 12 now serves as the R-LLE control-unit state machine but with:
all references to "left" and "L" changed, to "right" and "R",
the additional action "Notify MC 'R-entangled'" "takes place on arc 123"

The R-LLE control-unit state machine 107R of FIG. 11 now serves as the L-LLE control-unit state machine but with:
all references to "right" and "R" changed to "left" and "L",
the action on arc 113 "Notify MC 'R-entangled'" no longer takes place.

With regard to parity information, the repeater measures and stores the parity of its right LLE (rather than its left LLE), and merge control unit updates the received cumulative parity information by combining it with the stored right LLE parity and the parity of the local merge operation. The result is that the cumulative parity information received by a repeater is directly the parity of the entanglement between the left end node and the repeater.

It may also be noted that a hybrid form of repeater, with two complimentary varieties, is possible in which the direction of travel of the light fields during LLE creation, is opposite for the left and right sides of the repeater. Thus, in one variety of this hybrid repeater, the light fields are generated by the left and right sides of the repeater and after passage through L and R qubits respectively, are sent out over left and right local link fibres to the left and right neighbour nodes; in the other variety of this hybrid repeater, the light fields are received by the left and right sides of the repeater over left and right local link fibres respectively from the left and right neighbour nodes, are passed through L and R qubits respectively, and are then measured. It will be appreciated that in a chain of quantum repeaters of the foregoing hybrid form, it is necessary to alternate the two varieties of repeater. It will further be appreciated that the control units 82, 83, 87 can be arranged to build E2E entanglements from left to right or from right to left as desired.

Left End Node

Figure 14:
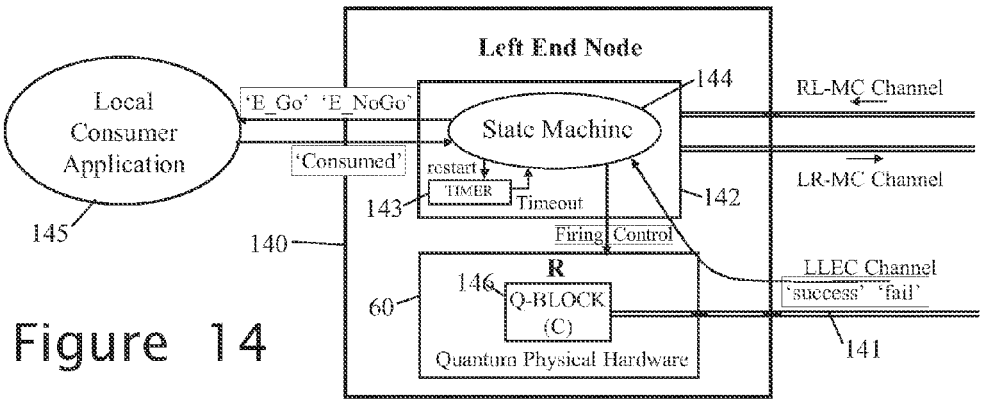
FIG. 14 is a diagram of an example implementation of a left end node of a chain of nodes having intermediate nodes formed by FIG. 10 quantum repeaters.
Figure 15:
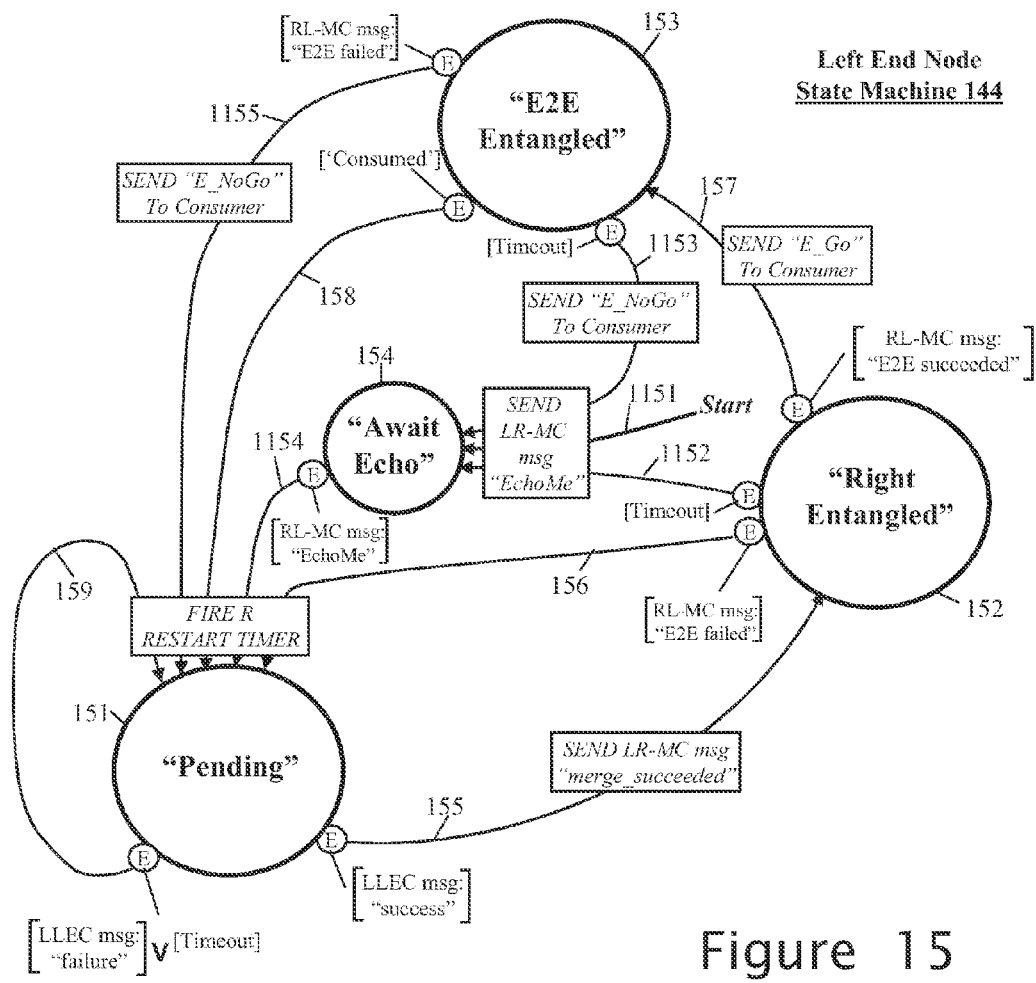
FIG. 15 is a state transition diagram of an example state machine implementation of a right-side local-link entanglement control unit of the FIG. 14 left end node.

With regard to the operation of the left end node of the chain of nodes whose intermediate nodes are constituted by "Extend-from-End" quantum repeaters 100 of the FIG. 10 form, this left end node 140 (FIG. 14) comprises quantum physical hardware 60 including a R-side Capture Q block 146 coupled to a local link fibre 141 connecting to the right neighbour repeater node, and a controller 142 with an associated qubit timeout timer 143. This controller 142 communicates with the right neighbour node over the LLEC and MC channels; the controller is also arranged to exchange messages with a local E2E-entanglement consumer application 145. The operation of the left-end-node controller 142 can be represented by a state machine 144 with a state transition diagram of the form shown in FIG. 15, this state machine being similar to the R-LLE control-unit state machine 107R (FIG. 11) but with modifications including two extra states one of which corresponds to waiting for the return of an EchoMe message, and the other of which corresponds to the R-side qubit of the left end node being successfully entangled with a L-side qubit of the right end node.

More particularly, the left-end-node state machine 144 has a first state 151 labelled "Pending", a second state 152 labelled "Right Entangled", a third state 153 labelled "E2E Entangled", and a fourth state 154 labelled "Await Echo". The signals input to/output by the state machine 144 comprise:

Input
'Timeout' signals received from the timer 143;
right-side LLE creation 'success' and 'failure' LLEC messages received from the right neighbour node over the LLEC channel;
'E2E failed' and 'E2E succeeded' messages received over the RL-MC channel;
'EchoMe' messages received over the RL-MC channel;
A 'Consumed' message received from the local consumer application 145 when it has used an E2E entanglement.

Output
'Restart' signals sent to the timer 143;
Firing Control signals sent to the R-side Q-block 146;
'EchoMe' and 'merge succeeded' messages sent over the LR-MC channel;
an 'E_Go' message sent to the local E2E-entanglement consumer application 145 to indicate that an E2E entanglement is ready to use; and
an 'E_NoGo' message sent to the local E2E-entanglement consumer application 145 to indicate that an E2E entanglement has become unusable.

The input signals constitute events that trigger state transitions.

When the left-end-node is started (arc 1151) it sends an 'EchoMe' LR-MC message and the state machine 144 enters its "Await Echo" state 154. As the 'EchoMe' message is echoed back by the right end node, it resets all the nodes; upon receipt back of the EchoMe message on the RL-MC channel, the state machine 144 initiates right-side LLE creation (by outputting appropriate Firing Control signals) and restarts its associated timer 143 before transiting to its "Pending" state 151.

If a right-side LLE is successfully created, the state machine 144 will receive an LLEC 'success' message which causes it to transit from its 'Pending' state 151 to its 'Right Entangled' state 152 (see arc 155) with a 'merge_succeeded' LR-MC message being sent to the MC unit of the neighbour node thereby making it the operative repeater in the terms of FIG. 9. The 'merge_succeeded' LR-MC message is sent even though the left end node has not carried out a merge operation because the successful creation of a right-side LLE is the left end node's equivalent of an "Extend-from-End" repeater merge operation in respect of extending an entanglement, anchored at the left end node, to the right neighbour node. As there is no parity information available (the left end node 140 does not receive any cumulative parity information, is not involved in a left LLE, and does not carry out a merge operation), the state machine 144 simply adds neutral parity information, that is, even parity indications, to the 'merge_succeeded' LR-MC message it sends out.

If right-side LLE creation is unsuccessful resulting in receipt of a LLEC 'failure' message, or if the useful lifetime of the R-side qubit times out resulting in receipt of a 'Timeout' signal, then right-side LLE creation is re-initiated (arc 159).

When the left-end-node state machine 144 is in its "Right Entangled" state 152 following successful right-side LLE creation, one of three relevant events may occur. Firstly, an 'E2E succeeded' RL-MC message may be received from the right end node indicating that an E2E entanglement has been successfully created; in this case, the state machine 144 notifies the consumer application 145 (by sending an E_Go message) and transits to its "E2E Entangled" state 153 (see arc 157). Secondly, an 'E2E failed' RL-MC message may be received in which case right-side LLE creation is re-initiated (arc 156) and the state machine 140 returns to its "Pending" state 151. Thirdly, a 'Timeout' signal may be received indicating timeout of the R-side qubit; since the building of an E2E entanglement could at this point have reached any node, the state machine 144 resets all the nodes by sending an LR-MC 'EchoMe' message, and then transits to its "Await Echo" 154 (arc 1152).

When the left-end-node state machine 144 is in its "E2E Entangled" state 153 following successful E2E Entanglement creation, one of three relevant events may occur. Firstly, a 'Timeout' signal may be received in which case the state machine 144 notifies the consumer application 145 (by sending it an 'E_NoGo' message) and resets all the nodes (by sending an LR-MC 'EchoMe' message) before transiting to its "Await Echo" state 154 (arc 1153). Secondly, a 'Consumed' message may be received from the consumer application 145 in which case right-side LLE creation is re-initiated (arc 156) and the state machine 144 transits to its Pending" State 144. Thirdly, an 'E2E failed' message may be received on the RL-MC channel (for example, because the right end node qubit has timed out); in this case, the state machine 144 notifies the consumer application (by sending it an 'E_NoGo' message) and reinitiates LLE creation before transiting to its "Pending" state 151 (are 1155).

The left end node also includes functionality for handling 'Path-broken' messages received over the RL-MC channel; this functionality may serve to generate an alarm signal and/or to effect the repeated sending of EchoMe messages on the RL-MC channel until received back on the LR-MC channel indicating that the fibre break has been rectified.

Right End Node

Figure 16:
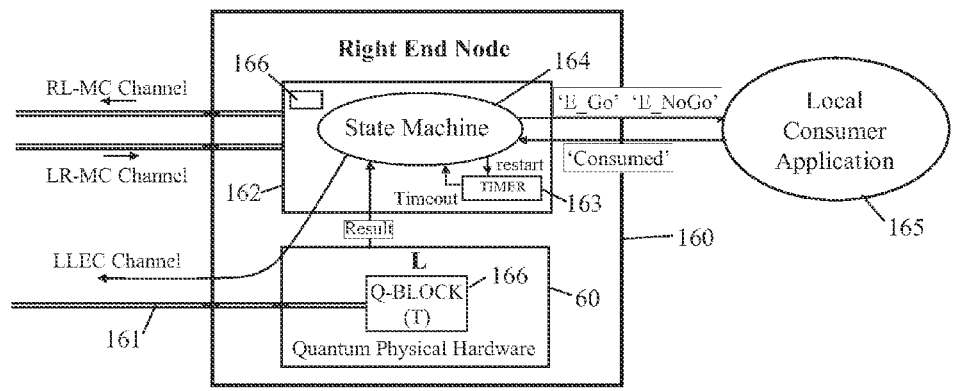
FIG. 16 is a diagram of an example implementation of a right end node of a chain of nodes having intermediate nodes formed by FIG. 10 quantum repeaters.
Figure 17:
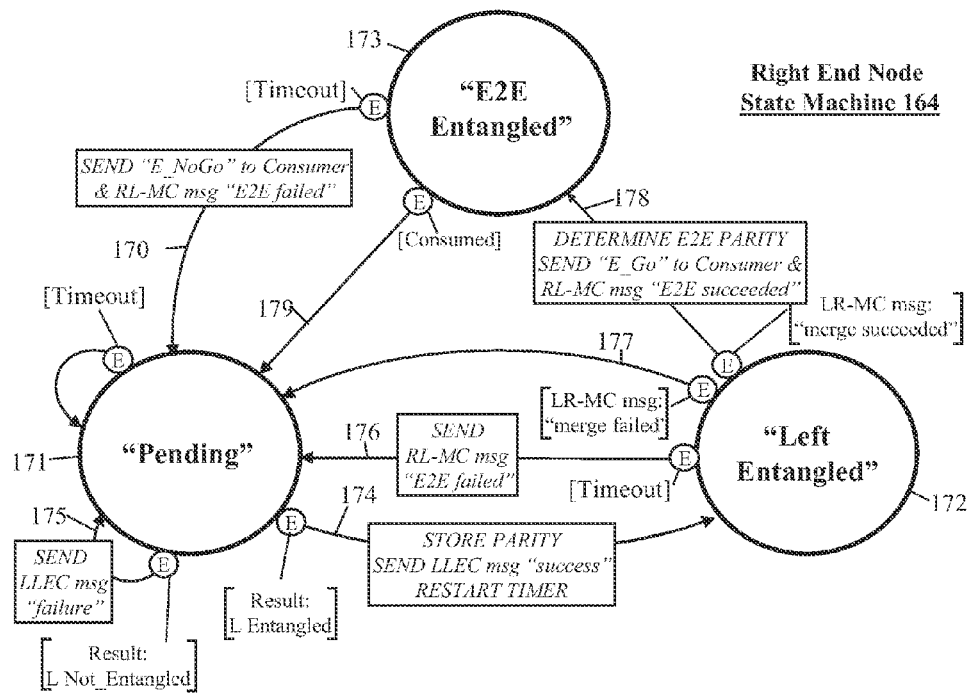
FIG. 17 is a state transition diagram of an example state machine implementation of a left-side local-link entanglement control unit of the FIG. 16 right end node.

With regard to the operation of the right end node of the chain of nodes whose intermediate nodes are constituted by "Extend-from-End" quantum repeaters 100 of the FIG. 10 form, this right end node 160 (FIG. 16) comprises quantum physical hardware 60 including a L-side Transfer Q-block 166 coupled to a local link fibre 161 connecting to the left neighbour repeater node, and a controller 162 with an associated qubit timeout timer 163. The controller includes a memory 166 for storing left LLE parity information. The controller 162 communicates with the left neighbour node over the LLEC and MC channels; the controller 162 is also arranged to exchange messages with a local E2E-entanglement consumer application 165. The operation of the right-end-node controller 162 can be represented by a state machine 164 with a state transition diagram of the form shown in FIG. 17, this state machine being similar to the L-LLE control-unit state machine 107L (FIG. 12) but with modifications including an extra state corresponding to the L-side qubit of the right end node being successfully entangled with the R-side qubit of the left end node.

More particularly, the right-end-node state machine 164 has a first state 171 labelled "Pending", a second state 172 labelled "Left Entangled", and a third state 173 labelled "E2E Entangled". The signals input to/output by the state machine 164 comprise:

Input

'Timeout' signals received from the timer 163;

LLE-creation Result signals 'L Entangled' and 'L Not_Entangled' received from the quantum physical hardware 60 to indicate whether or not the L-side qubit has been successfully entangled by a light field received from the left neighbour repeater node;

'Merge succeeded' and 'merge failed' messages received from the left neighbour node over the LR-MC channel;

'EchoMe' messages received, over the LR-MC channel; and a 'Consumed' message received from the local E2E-entanglement consumer application 165 when it has used an E2E entanglement.

Output

'Restart' signals sent to the timer 163;

left-side LLE creation 'success' and 'failure' LLEC messages sent over the LLEC channel to the left neighbour node;

'E2E failed' and 'E2E succeeded' messages sent over the RL-MC channel;

'EchoMe' messages sent over the RL-MC channel;

an 'E_Go' message sent to the local E2E-entanglement consumer application 165 to indicate that an E2E entanglement is ready to use; and an 'E_NoGo' message sent to the local E2E-entanglement consumer application 165 to indicate that an E2E entanglement has become unusable.

The input signals constitute events that trigger state transitions.

With the right-end-node state machine 164 in its "Pending" state 121, if it now receives a 'L Entangled' Result signal from the quantum physical hardware 60 telling it that the L-side qubit has been successfully entangled in a LLE (initiated by its left neighbour node), the right-end-node state machine 164 transits to its "Left Entangled" state 172 (are 174). At the same time, the state machine 164 stores the parity of the left LLE in memory 166, sends a LLEC 'success' message to the left neighbour node, and restarts its associated timer 163 to start timing down the useful lifetime of the L-side qubit.

However, if when in its "Pending" state, the right-end-node state machine 164 receives a 'L Not Entangled' Result signal from the quantum physical hardware 60 telling it that a left-side LLE creation attempt has failed, the state machine 164 sends a LLEC 'failure' message to the left neighbour node (are 175) and remains in its "Pending" state 171. Receipt of a 'Timeout' signal by the state machine 164 when in its "Pending" state, simply results in the state machine remaining in this state.

When the right-end-node state machine 164 is in its "Left Entangled" state 172 following successful left-side LLE creation, one of three relevant events may occur. Firstly, a 'Timeout' signal may be received in which case the left end node is notified through a 'E2E failed' message sent on the RL-MC channel, and the state machine 164 returns to its "Pending" state 171(are 176). Secondly, a 'merge failed' LR-MC message may be received from the left neighbour node in which case the state machine 164 simply returns to its "Pending" state 171 (are 17). Thirdly, a 'merge succeeded' LR-MC message may be received from the left neighbour node in which case the state machine 164 (i) determines the parity of the newly created E2E entanglement by combining the cumulative parity received in the 'merge succeeded' message with the left LLE parity stored in memory 166, (ii) sends an 'E_Go' message to the local consumer application 165 to notify it that an E2E entanglement is available (this message including the E2E parity information), and (iii) sends an 'E2E succeeded' RL-MC message to the left end node (are 178); the state machine 164 then transits to its "E2E Entangled" state 173.

When the right-end-node state machine 164 is in its "E2E Entangled" state 173 following successful E2E entanglement creation, one of two relevant events may occur. Firstly, a 'Consumed' message may be received from the local consumer application in which case the state machine transits to its "Pending" state 171. Secondly, a 'Timeout' signal may be received in which case the state machine 164 both sends an 'E_NoGo' message to the local consumer application 165 to notify it that an E2E entanglement is no longer available, and sends an 'E2E failed' RL-MC message to the left end node (are 170); the state machine 164 then transits to its "Pending" state 171.

The right end node also includes functionality for responding to an 'EchoMe' message received over the LR-MC channel by sending the message back on the RL-MC channel and causing the right-end-node state machine 164 to transit to its "Pending state" 171 regardless of its previous state; additionally, if the state machine's previous state was "E2E Entangled", an 'E-NoGo' message is sent to the local consumer application 165.

Increasing Throughput

Various modifications can be made to the above-described first quantum repeater embodiment with a view to increasing the rate of successful E2E entanglement creation. Five such modifications are discussed below, it being understood that these modifications can be used alone or in combination to increase the rate of E2E entanglement creation.

1) Freeing-Up the Node Chain for Immediate Re-Use

Figure 18:
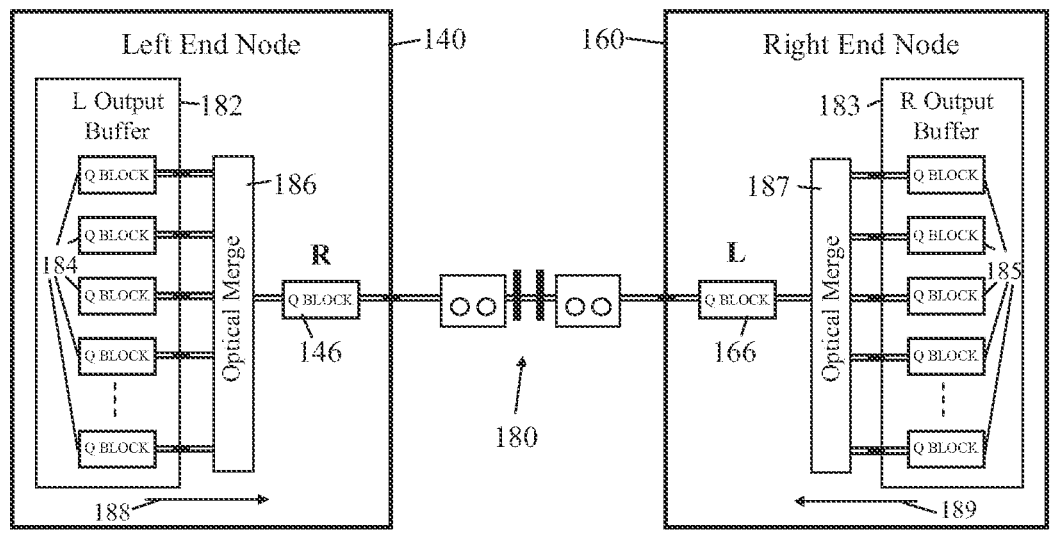
FIG. 18 is a diagram illustrating the provision of output buffers in the left and right end nodes of FIGS. 14 and 16.

As so far described, once an E2E entanglement has been created, the chain of nodes (left and right end nodes 140, 160 and intermediate repeater nodes 180—see FIG. 18) cannot be re-used until the consumer applications consume the existing E2E entanglement—this is because the E2E entanglement exists between the R Q-block 146 of the left end node 140 and the L Q-block 166 of the right end node 160.

To free up the R Q-block 146 of the left end node 140 and the L Q-block 166 of the right end node 160 (and thereby the node chain) without waiting upon the consumer applications, the left and right end nodes 140, 160 can be provided with respective output buffers 182, 183 each comprising multiple Q-blocks 184, 185 respectively. The optical fabric and controller of each end node are set up to enable any selected one of the node's output-buffer Q-blocks 184, 185 to be entangled with the node's R or L Q-block 146, 166 (as the case may be) whereby to move the E2E entanglement across into the selected buffer Q-block; this operation involves substantially the same Capture and Transfer interactions as are depicted in FIG. 1 (but carried out over a short distance and therewith with a high probability of success). Thus, once an the E2E entanglement has been created between the R Q-block 146 of the left end node 140 and the L Q-block 166 of the right end node 160, the two ends of the entanglement are moved across into available left and right buffer Q-blocks 184, 185. The node chain is now free to create another E2E entanglement which in turn can be moved across into available left and right buffer Q-blocks 184, 185 and so on.

FIG. 18 depicts a particular optical fabric implementation that uses only optical merge units 186, 187 to couple the buffer Q-blocks to the R and L Q-blocks 146, 166.

More particularly, in the left end node 140, optical merge unit 186 couples the buffer Q-blocks 184 to the R Q-Block 146. The buffer Q-blocks 184 have Capture interaction functionality and the R Q-block 146 now possess Transfer interaction capability in addition to the Capture interaction capability if uses to set up an LLE with its neighbour repeater node. To transfer the left end root of an E2E entanglement from the R Q-block 146 to a particular buffer Q-block 184, the qubit of latter is first entangled with the qubit of the R Q block 146 by an entanglement operation; this is effected by selectively energizing the emitter associated with the buffer Q-block 184 concerned thereby causing a light field to traverse the qubit of that Q-block before being channelled by the optical merge unit 186 to the R Q-block 146 (as generally indicated by arrow 188). Thereafter, the qubit of the R Q-block 146 is removed from entanglement by an X measurement operation.

In the right end node 160, optical merge unit 187 couples the buffer Q-blocks 185 to the L Q-Block 166; again, the buffer Q-blocks 185 have Capture interaction functionality and the L Q-block 166 already possess the required Transfer interaction capability. To transfer the right end roof of an E2E entanglement from the L Q-block 166 to a particular buffer Q-block 185, the qubit of the latter is first entangled with the qubit of the L Q block 166 by an entanglement operation; this is effected by selectively energizing the emitter associated with the buffer Q-block 185 concerned thereby causing a light field to traverse the qubit of that Q-block before being channelled by the optical merge unit 187 to the L Q-block 166 (as generally indicated by arrow 189). Thereafter, the qubit of the L Q-block 166 is removed from entanglement by an X measurement operation.

It will be appreciated that different optical fabric implementations are possible; for example, to reverse the light-field direction of travel 189 in the right end node, an active optical switch could be used to optically couple the L Q-block 166 to a selected buffer Q-block 185 (in this case, the L Q-block 166 would need Capture interaction capability and the buffer Q-blocks would need Transfer interaction capability).

It will further be appreciated that associated with the operation of moving of an E2E entanglement into a buffer Q-block, will be a parity measurement. If the measured parity is even, no further action is needed as the parity of the E2E entanglement unchanged; however, if the measured parity is odd, then to keep the E2E entanglement the same, the buffer qubit concerned is flipped.

2) Parallel Operation of Node Chain Segments

By splitting the chain of nodes into multiple segments each with its own pair of left and right end nodes, creation of extended entanglements can be effected in parallel (over respective segments); these E2E segment entanglements can then be merged, to created, the final E2E entanglement.

Figure 19:
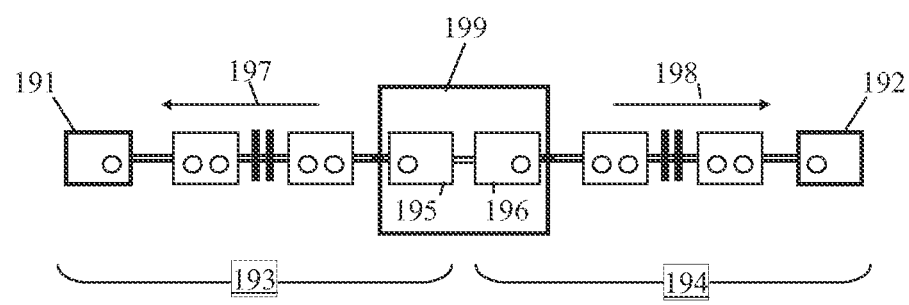
FIG. 19 is a diagram showing an example segmentation of a chain of quantum repeater nodes.

One particular example arrangement of such segmentation is depicted in FIG. 19. In this case, the ultimate end nodes between which it is desired to create an E2E entanglement are left end node 191 and right end node 192. The chain of nodes (end nodes 191, 192 and intermediate repeater nodes) is divided into a first segment 193 and a second segment 194.

The end nodes of the first segment 193 are the left end node 191 and a sub-node 195 of a segment-spanning node 199. The segment 193 is arranged to build an E2E segment entanglement right to left (arrow 197) and, to this end, the functionality of the sub-node 195 corresponds to that of the previously described left end node 140 whereas the functionality of the left end node 191 corresponds to that of the previously described right end node 160.

The end nodes of the second segment 194 are right end node 192 and a sub-node 196 of the segment-spanning node 199. The segment 194 is arranged to build an E2E segment entanglement left to right (arrow 198) and, to this end, the functionality of the sub-node 196 corresponds to that of the previously described left end node 140 whereas the functionality of the right end node 192 corresponds to that of the previously described right end node 160.

The segment-spanning node 199 is the initiator of E2E segment entanglement building over both segments 193 and 194 and, in due course, will receive an 'E2E succeeded' message from each of the end nodes 191 and 192 informing it of the successful creation of E2E segment entanglements. The segment-spanning node 199 now merges these E2E segment entanglements to generate the desired E2E entanglement between nodes 191 and 192. The segment-spanning node 199 thus not only possesses end node functionality but also merge functionality.

3) Enhancing LLE Creation Success Rate

As noted above, the probability of a successfully entangling two qubits coupled by a 10 km fibre is of the order of 25% which means that, for quantum repeaters of the FIG. 10 form spaced by distances of the order of 10 km, on average it will take four attempts at entanglement to achieve success, each attempt taking at least the light-speed round trip time between repeaters. This clearly limits the rate at which E2E entanglements can be created. Matters can be improved by increasing the probability of success of each entanglement attempt.

The simplest way of doing this is to expand each LLE creation subsystem by paralleling up the pairing of a R-side Q-block of one repeater and the L-side Q-block of the neighbour repeater so that there are multiple such pairings; at each entanglement attempt every R-side Q-block would be fired at its paired L-side Q-block.

Figure 20:
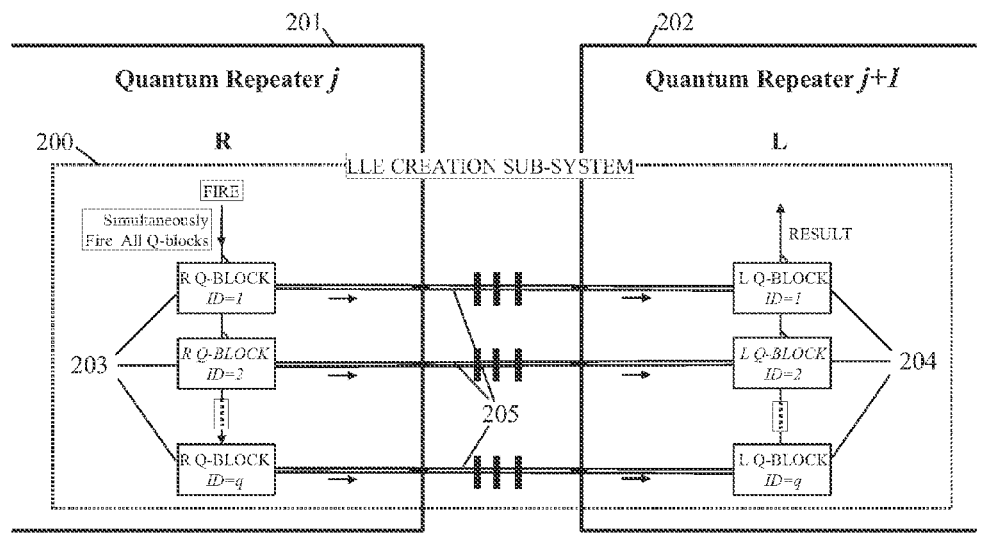
FIG. 20 is a diagram of an alternative local link entanglement creation subsystem for use in quantum repeaters of the FIG. 10 form.

Such an arrangement is shown in FIG. 20 for an LLE creation subsystem 200 formed between quantum repeater $QR_j$ 201 and its right neighbour repeater $QR_{(j+1)}$ 202. The R-side of the quantum physical hardware of repeater $QR_j$ 201 comprises q Capture Q-blocks 203 with respective IDs 1 to q. Similarly, the L-side of the quantum physical hardware of repeater $QR_{(j+1)}$ 202 comprises q Transfer Q-blocks 204 with respective IDs 1 to q. Each R-side Q-block 203 in repeater $QR_j$ 201 is optically coupled by a respective local link optical fibre 205 to the corresponding L-side Q-block of repeater $QR_{(j+1)}$ 202. When the R-LLE control unit of repeater $QR_j$ 201 outputs a Fire signal to its quantum physical hardware to trigger an LLE creation attempt, all q Q-blocks 203 are simultaneously fired and the emitted light fields pass along respective ones of the local link optical fibres 205 to the corresponding Q-blocks 204 of repeater $QR_{(j+1)}$ 202. The result signals from the Q-blocks 204 are passed to the L-LLE control unit of repeater $QR_{(j+1)}$ 202 which:

in the case where the Result signals indicate that no entanglement were created, sends an LLEC 'failure' message to repeater $QR_j$ 201;

in the case where the Result signals indicate that only one entanglement was created, sends an LLEC 'success' message to repeater $QR_j$ 201, the message including the ID of the successful Q-block 204;

in the case where the Result signals indicate that multiple entanglements were created, selects one successful Q-block 204 and sends an LLEC 'success' message to repeater $QR_j$ 201, the message including the ID of the selected successful Q-block 204; the L-LLE control unit only stores left LLE parity information in respect of the selected left LLE. As an alternative to the L-LLE control unit of repeater $QR_{(j+1)}$ 202 selecting the successful Q-block to use, the IDs of all successful Q-blocks could be included in the LLEC 'success' message, the selection of one from the successful Q-blocks being left to the R-LLE control unit of repeater $QR_j$ 201; however, this complicates how parity information is handled, one example implementation requiring parity information for all successful left LLEs to be stored by the L-LLE control unit of repeater $QR_{(j+1)}$ 202 until informed by the repeater $QR_j$ 201 in a 'merge succeeded' LR-MC message which one has been selected for merging.

The R-LLE control unit of repeater $QR_j$ 201 either itself stores the ID of the selected Q-block 204 or passes it to the MC unit for storage (this ID serves to identify the corresponding successful Q-block 203 of repeater $QR_j$ 201). When the MC unit comes to effect a merge, it retrieves the stored Q-block ID so that it knows which R-side Q-block to use. In due course the repeater $QR_{(j+1)}$ 202 becomes the operative repeater and itself comes to effect a merge, it knows which L-side Q-block 204 to use either because its ID was previously locally stored or because the ID was included in the LR-MC 'merge_succeeded' message it received from repeater $QR_j$ 201.

Figure 21:
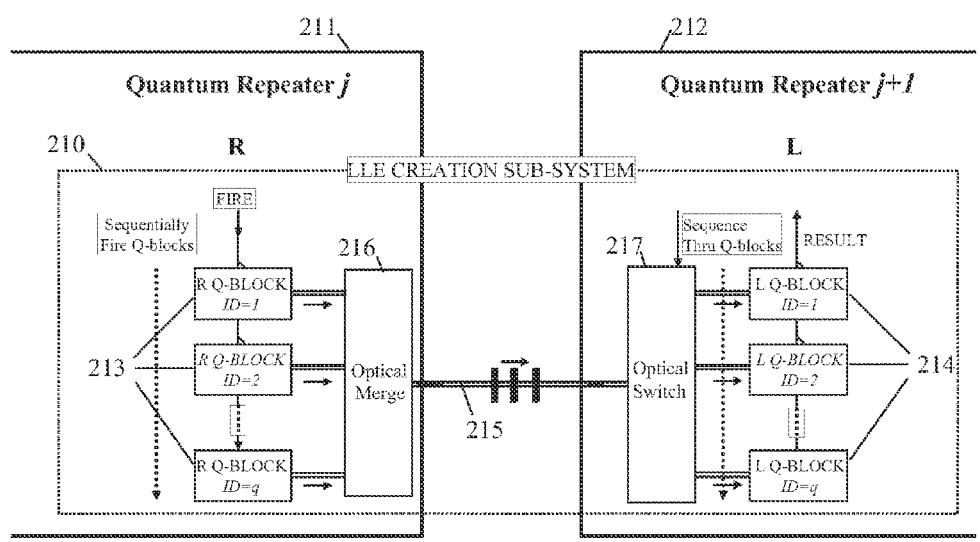
FIG. 21 is a diagram of another alternative local link entanglement creation subsystem for use in quantum repeaters of the FIG. 10 form.

Of course, the arrangement shown in FIG. 20 is inefficient in that it uses a respective optical fibre for each pairing of R-side Q-block 203 and L-side Q-block 204. By staggering the firing of the R-side Q-blocks 203 of repeater $QR_j$, it is possible to multiplex the emitted light fields onto a single fibre and such an arrangement is illustrated in FIG. 21 for an LLE creation subsystem 210 formed between quantum repeater $QR_j$ 211 and its right neighbour repeater $QR_{(j+1)}$ 212.

The R-side of the quantum physical hardware of repeater $QR_j$ 211 comprises q Capture Q-blocks 213 with respective IDs 1 to q. Similarly, the L-side of the quantum physical hardware of repeater $QR_{(j+1)}$ 212 comprises q Transfer Q-blocks 214 with respective IDs 1 to q. Each R-side Q-block 213 in repeater $QR_j$ 211 is optically coupled by an optical merge unit 216 to local link optical fibre 215. Fibre 215 feeds optical switch 217 of repeater $QR_{(j+1)}$ 212, the outputs of the switch feeding respective ones of the L-side Q-blocks of repeater $QR_{(j+1)}$ 212. When the R-LLE control unit of repeater $QR_j$ 211 outputs a Fire signal to its quantum physical hardware to trigger an LLE creation attempt, the Q-blocks 213 are sequentially fired and the emitted light fields pass through the merge unit 216 and onto the fibre 215; in due course the light field arrive in sequence at the optical switch 217 of repeater $QR_{(j+1)}$ 212 and are switched to corresponding ones of the Q-blocks 214, Operation is then substantially as described above for the FIG. 20 arrangement. Each light field may be preceded by its own herald light pulse or a single herald can be provided preceding the sequence of light fields (the individual fields not having their own separate heralds in this case).

Appropriate operation of the switch to ensure that the light field associated with the $QR_j$ Q-block 213 with ID=k is passed to the $QR_{(j+1)}$ Q-block 214 with the same ID, can be achieved in a number of ways. For example, a herald pulse at the front of the sequence of light fields arriving at the switch 217 can be used to trigger sequential switching according to the same timing as used to sequentially fire the Q-blocks 213 of repeater $QR_j$ 211. Alternatively, the switch can simply count the incoming light fields and switch according. The time interval between adjacent light fields in the sequence of light fields arriving at the switch 217 is advantageously kept as small as possible consistent with giving enough time for the optical switch 217 to change over between Q-blocks 214 of repeater $QR_{(j+1)}$.

Rather than sequentially firing the Q-blocks 213 of repeater $QR_j$ 211, an equivalent result can be achieved by firing them all together but using different lengths of fibre to connect each Q-block to the optical merge unit 216, thereby introducing different delays.

Because the FIG. 10 repeater embodiment can only handle one right LLE at a time, the arrangements of FIGS. 20 and 21 may appear profligate in their use of Q-blocks, notwithstanding the objective of increasing the LLE creation success rate. However, with regard to the R-side Q blocks of repeater $QR_j$, it should be noted that once fired, each of these Q-blocks cannot be used again at least until the result of the entanglement it was attempting to achieve is known (at least the round trip time to repeater $QR_{(j+1)}$), therefore a R-side Q block cannot be rapidly re-used to try to increase LLE creation success rates. On the other hand, because the result of an attempted entanglement will be very quickly known at a L-side Q block of repeater $QR_{(j+1)}$, it is possible to rapidly re-use the Q-block unless and until a successful entanglement is achieved. This leads to the "firing squad" arrangement depicted in FIG. 22 for an LLE creation subsystem 220 formed between quantum repeater $QR_j$ 221 and its right neighbour repeater $QR_{(j+1)}$ 222.

More particularly, the R-side of the quantum physical hardware of repeater $QR_j$ 221 comprises f Q-blocks 223 (with respective IDs 1 to f) that have Capture interaction functionality. These Q-blocks 223 collectively form a "firing squad" 227. The L-side of the quantum physical hardware of repeater $QR_{(j+1)}$ 222 comprises a single Q-block 224 with Transfer interaction functionality. The Q-blocks 223 of the firing squad 227 of repeater $QR_j$ 221 are optically coupled by an optical merge unit 226 to local link optical fibre 225 that in turn is optically coupled to the single L-side Q-block 224 of repeater $QR_{(j+1)}$ 212. Thus, as can be seen, all the Q-blocks 223 of the firing squad 227 (herein "fusilier" Q-blocks) are aimed to fire at the same target Q-block 224.

When the R-LLE control unit of repeater $QR_j$ 221 outputs a Fire signal to its quantum physical hardware to trigger an LLE creation attempt, the fusilier Q-blocks 223 of the firing squad 227 are sequentially fired and the emitted light fields pass through the merge unit 226 and onto the fibre 225 as a light field train 228, It may be noted that there will be an orderly known relationship between the fusilier Q-block IDs and the order in which the light fields appear in the train. Rather than each light field being preceded by its own herald, a single herald 229 preferably precedes the light field train 228 to warn the target Q-block 224 of the imminent arrival of the tram 228 (this herald 229 being generated, for example, by a dedicated emitter, not shown, of the firing squad in response to the Fire signal and in advance of the firing of the fusilier Q-blocks 223).

As each light field arrives in sequence at the target Q-block 224 of repeater $QR_{(j+1)}$ 212, the shutter of the target Q-block is briefly opened to allow the light field to pass through the qubit of the target Q-block to potentially interact with the qubit, the light field thereafter being measured to determine whether an entanglement has been created. If no entanglement has been created, the qubit of target Q-block 224 is reset and the shutter is opened again at a timing appropriate to let through the next light field of the train 228. However, if an entanglement has been created by passage of a light field of train 228, the shutter of the target Q-block is kept shut and no more light fields from the train 228 are allowed to interact with the qubit of target Q-block 224. The measurement-result dependent control of the Q-block shutter is logically part of the L-LLE control unit associated with the L-side target Q-block 224 though, in practice, this control may be best performed by low-level control elements integrated with the quantum physical hardware.

It will be appreciated that the spacing of the light fields in the train 228 should be such as to allow sufficient time for a determination to be made as to whether or not a light field has successfully entangled the target qubit, for the target qubit to be reset, and for the Q-block shutter to be opened, before the next light field arrives.

In fact, rather than using an explicit shutter to prevent disruptive interaction with the target qubit of light fields subsequent to the one responsible for entangling the target qubit, it is possible to achieve the same effect by transferring the qubit state from electron spin to nuclear spin immediately following entanglement whereby the passage of subsequent light fields does not disturb the captured entangled state (the target qubit having been stabilized against light-field interaction). It may still be appropriate to provide a shutter to exclude extraneous light input prior to entanglement but as the qubit is not set into its prepared state until the herald is detected, such a shutter can generally be omitted.

The L-LLE control unit is also responsible for identifying which light field of the train successfully entangled the target qubit and thereby permit identification of the fusilier Q-block 223 (and thus the qubit) entangled with the target Q-block qubit (as already noted, there is a known relationship between the fusilier Q-block IDs and the order in which the light fields appear in the train). For example, the light fields admitted to the target Q-block may simply be counted and this number passed back to the repeater QR, in an LLEC 'success' message, the recipient R-LLE control unit performing any needed conversion of this number to the ID number of the successful fusilier Q-block 223 before storing the latter, for example in a register, for later reference (alternatively, the fusilier ID may be passed on immediately). Of course, if none of the light fields of train 228 is successful in creating an entanglement, an LLEC 'fail' message is returned.

As there is only one target Q-block 224, the handling of left LLE parity information is the same as previously described for the FIG. 10 repeater.

As with the FIG. 21 arrangement, rather than sequentially firing the fusilier Q-blocks 223 of repeater $QR_j$ 221, an equivalent result can be achieved by firing them all together but using different lengths of fibre to connect each fusilier Q-block to the optical merge unit 226, thereby introducing different delays and creating the light field train 228.

The number of fusilier Q-blocks 223 in the firing squad 227 is preferably chosen to give a very high probability of successfully entangling target Q-block 224 at each firing of the firing squad, for example 99% or greater. More particularly, if the probability of successfully creating an entanglement with a single firing of a single fusilier Q-block is s, then the probability of success for a firing squad of f fusilier Q-blocks will be:

Firing squad success probability=$1-(1-s)^f$ whereby for s=0.25, 16 fusilier Q-blocks will give a 99% success rate and 32 fusilier Q-blocks a 99.99% success rate. Typically one would start with a desired probability $P_{success}$ of successfully entangling the target qubit with a single firing (i.e. a single light-field train) and then determine the required number f of fusilier qubits according to the inequality:

$P_{success} \leq 1-(1-s)^f$

The same formulae also apply to the arrangements of FIGS. 20 and 21 (with f being set to the value of q in respect of those arrangements).

The time interval between adjacent light fields in the train 228 is advantageously kept as small as possible consistent with giving enough time for the earlier light field to be measured, the target qubit reset and its shutter opened before the later light field arrives. By way of example, the light fields are spaced by 1-10 nanoseconds.

It may be noted that when using a LLE creation subsystem that provides a high probability of success, it becomes practical to assume that every triggering of the LLE creation subsystem is successful and to simplify the overall control paradigm so that a repeater only initiates the creation of a right LLE upon becoming the operative repeater. In this case, the overall time taken to successfully create an E2E entanglement becomes substantially constant and the left end node can therefore be arranged to start the building of a new E2E entanglement after this time rather than relying on the RL-MC "E2E succeeded" and "E2E failed" messages to indicate when the building of a new E2E entanglement can be started. Since, as already noted above, detection of failed E2E entanglements can be left to the consuming applications, it now becomes possible to dispense with the RL-MC "E2E succeeded" and "E2E failed" messages entirely.

4) Free-Running LLE Creation

In the FIG. 10 quantum repeater, right LLE creation attempts are triggered by timeout of an existing right LLE, consumption in a merge operation of an existing right LLE, or failure of a previous right LLE attempt. This results in a period at least as long as the light-speed round trip time to the left neighbour node in which no right LLE is available.

An alternative strategy is possible that reduces this non-availability period in most cases; more particularly, right LLE creation attempts are not triggered by need but happen continually, for example with a periodicity that is a fraction of the round trip time. A currently existing right LLE is not disturbed by a new creation attempt but left available for use in a merge operation. However, whenever a successful right LLE creation attempt is reported, the new right LLE replaces the pre-existing one as the LLE waiting to be merged, the pre-existing right LLE being abandoned and the Q-blocks associated with it being freed up for re-use. The right LLE waiting to be merged will therefore always be relatively fresh and timeouts will be very unlikely. Also, if the waiting right LLE does get consumed in a merge operation, an LLE creation attempt will already be underway (unless the periodicity is less than or equal to the round trip time and the merge takes place just after a right LLE creation attempt is initiated).

Of course, reduction in the right LLE non-availability period in this way comes at a cost, this being the need for sufficient Q-blocks to support a waiting right LLE as well as one or more on-going right LLE creation attempts.

Figure 23:
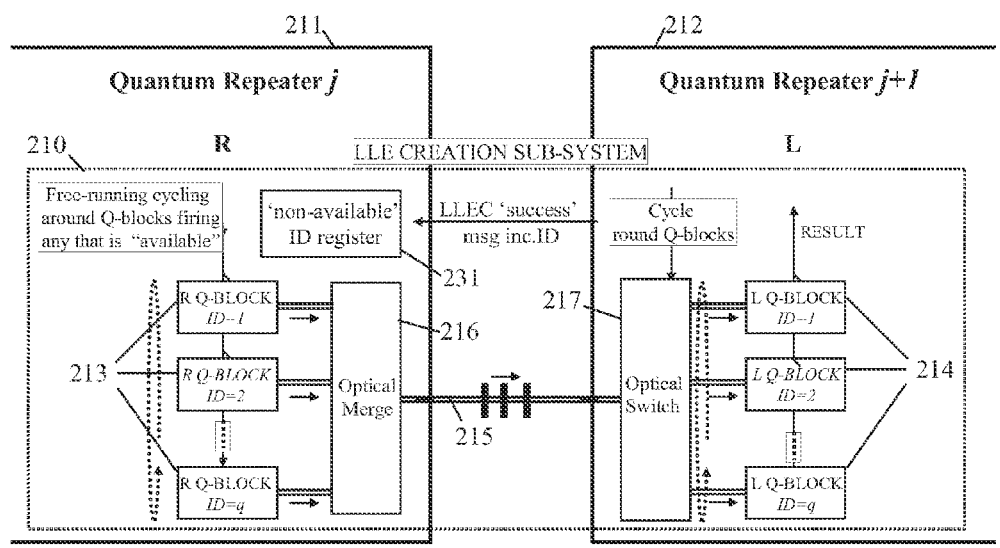
FIG. 23 is a diagram of a still further alternative local link entanglement creation subsystem for use in quantum repeaters of the FIG. 10 form.

By way of example, FIG. 23 shows an adaptation of the FIG. 21 arrangement that can be used for implementing the above strategy (the same references are used in FIG. 23 as in FIG. 21 for elements which are substantially the same). More particularly, rather than the R-side Q-blocks 213 of repeater $QR_j$ being fired once in quick succession in response to a Fire signal, the R-side Q-blocks 213 are sequentially and cyclically fired, that is, in each of an endless succession of cycles, the R-side Q-blocks 213 are each fired once, one after another at equal time intervals throughout the cycle—however, the R-side Q-block 213 associated with the current waiting right entanglement is not fired (the ID number of this Q-block being stored in a register 231 to indicate its non-availability to participate in right LLE creation attempts). At repeater $QR_{(j+1)}$, the optical switch 217 is cyclically switched such as to pass the incoming light fields to the appropriate L Q-blocks 214 of repeater $QR_{(j+1)}$. Each successful entanglement is reported to the repeater $QR_j$ in a LLEC 'success' message which also includes the ID of the Q-block concerned. At the repeater $QR_j$ this ID number replaces that of the previous waiting right LLE in register 231 to indicate the non-availability of the identified Q-block to participate in the next right LLE creation attempts, the replacement in register 231 of the ID associated with the previous waiting right LLE freeing up the Q-block concerned for re-use.

The repeater $QR_{(j+1)}$ also needs to keep track of which Q-block 214 is not available as a result of being used for the current waiting right LLE. By simply arranging for the cyclic firing of the Q-blocks 213 of repeater $QR_j$ to involve doing nothing at the point when it is would otherwise be firing the Q-block associated with the current waiting right LLE so that in each cycle there is a gap in the regular firing of the Q-blocks, the optical switch 217 can simply cycle round in correspondence to the firing cycle of the Q-blocks 213 without needing to know which Q-block 214 is unavailable since there will be no light field presented in respect of the unavailable Q-block.

Since more than one LLE may exist at any given moment, it is necessary for parity information on multiple LLEs to be stored. One example way of doing this is to arrange for the L side of repeater $QR_{(j+1)}$ to be able to store parity data on all possible LLEs, the repeater being in due course informed by the repeater $QR_j$ in a 'merge_succeeded' message which LLE has been used in a merge and therefore which LLE parity data needs to be included in the cumulative parity information.

With q L Q-blocks 213 (and q R Q-blocks 214) and a round trip time of $T_{RT}$, the gap between successive creation attempts is on average $T_{RT}/(q-1)$.

Figure 22:
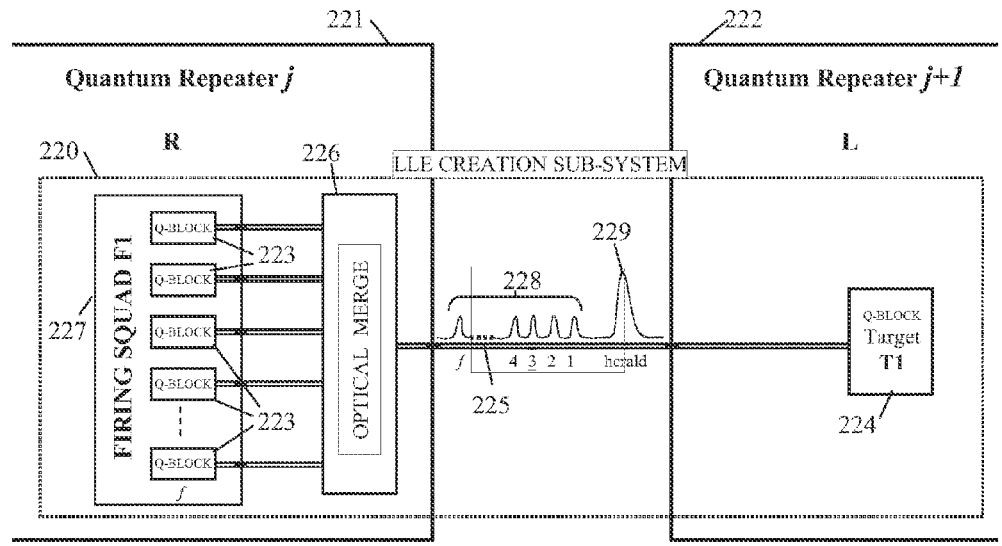
FIG. 22 is a diagram of a farther alternative local link entanglement creation subsystem for use in quantum repeaters of the FIG. 10 form.

It is also possible to operate the FIG. 22 arrangement in the same manner, that is, rather than waiting for a need-based trigger (timeout of an existing right LLE, consumption in a merge operation of an existing right LLE, or failure of a previous right LLE attempt), the firing squad 227 can be fired at regular (or irregular) intervals unrelated to need.

5) Banking LLEs

Where multiple Q-blocks are provided on both sides of an LLE creation subsystem (as in the arrangements of FIGS. 20, 21 and 23), the possibility arises of more than one LLE existing at the same time between the nodes concerned. In the arrangements of FIGS. 20, and 21, up to q LLEs may be created at each attempt though only one is selected to endure, whereas in the FIG. 23 arrangement, there is a brief overlap in the existence of two LLEs before the later-created one replaces the earlier created one. Rather than abandoning excess LLEs (that is, LLEs beyond the one waiting to be merged), one, some or all of these excess LLEs can be kept in reserve ('banked') in a queue and so immediately available to become the waiting LLE when the previous LLE fulfilling this role is merged or times out. This, of course, requires the relevant Q-blocks to be unavailable to participate in LLE creation which can be readily achieved, by using a 'non-available' ID register similar to the register 231 of FIG. 23.

The second "Extend-from-End" quantum repeater embodiment employs such an LLE banking arrangement and will next be described.

Second "Extend-from-End" Quantum Repeater Embodiment (FIG. 24)

The second "Extend-from-End" quantum repeater embodiment 240 is shown in FIG. 24, it being understood that the quantum repeater 240 operates in the context of being an intermediate node in a chain of nodes (such as depicted in FIG. 9) between the left and right end nodes of which E2E entanglements are to be created.

The second quantum repeater embodiment 240 of FIG. 24 is similar in form and operation to the first quantum repeater embodiment 100 of FIG. 10 and the same references are used in FIG. 24 as in FIG. 10 for elements which are substantially the same. The main differences between the first and second embodiments is that in the second quantum repeater embodiment 240:

- there are multiple L-side and R-side Q-blocks 44 (in this example, there are q L-side Q-blocks with respective IDs 1 to q, and p R-side Q-blocks with respective IDs 1 to p; p may be the same as, or different from, q);
- the internal details of the L-LLE and R-LLE control units 82' and 83' differ from those of the corresponding units of the FIG. 10 repeater—in particular, the control units 82', 83' are adapted to control the operation of multiple Q-blocks and to queue multiple created LLEs for subsequent use;
- various of the signals and messages include Q-block ID information to identify the particular Q-blocks to which the messages/signals relate.

The details of the form of LLE creation subsystems 241 and 242 of which the L-side and R-side Q-blocks respectively form a part, and of the L-LLE and R-LLE control units 82' and 83' are described below. The merge control unit 87 and its associated fibre interface 105 of the FIG. 24 quantum repeater 240 operate substantially in the same way as the merge control unit and fibre interface of the FIG. 10 quantum repeater 100 apart from the inclusion of Q-block ID information in various messages and signals; accordingly, the description of these elements will not be repeated in respect of the FIG. 24 quantum repeater 240 (though the main differences will be described).

Figure 25:
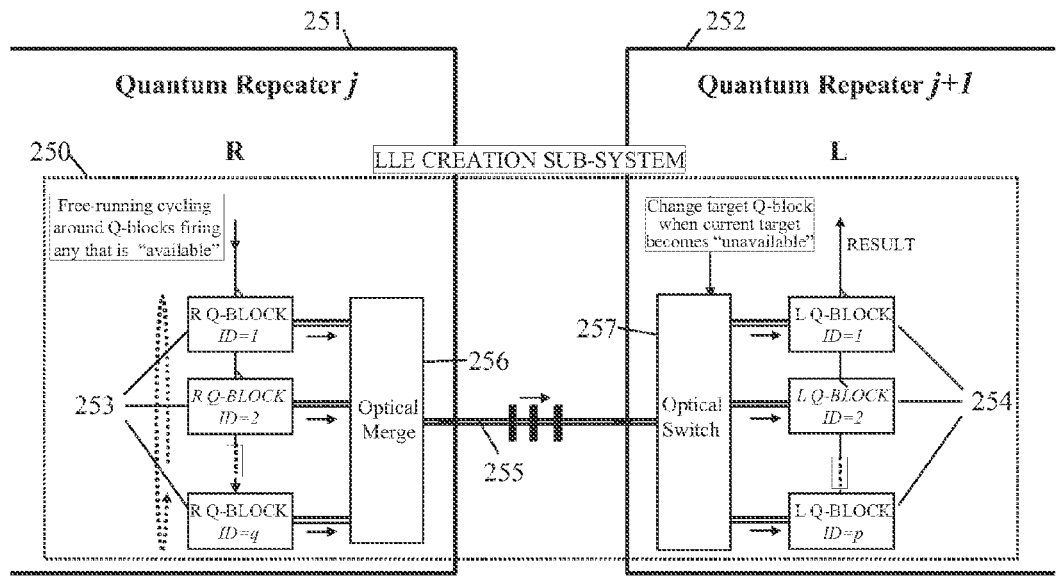
FIG. 25 is a diagram of a local link entanglement creation subsystem formed by neighbouring quantum repeaters of the FIG. 24 form.

FIG. 25 depicts one implementation for the LLE creation subsystems 241 and 242 with multiple L-side and R-side Q-blocks. The FIG. 25 arrangement is depicted as existing between a quantum repeater $QR_j$ 251 and its right neighbour repeater $QR_{(j+1)}$ 252. The R-side of the quantum physical hardware of repeater $QR_j$ 251 comprises q Capture Q-blocks 253 with respective IDs 1 to q. The L-side of the quantum physical hardware of repeater $QR_{(j+1)}$ 252 comprises p Transfer Q-blocks 254 with respective IDs 1 to p. The R-side Q-blocks 253 in repeater $QR_j$ 211 are coupled by an optical merge unit 256 to local link optical fibre 255. Fibre 255 feeds optical switch 257 of repeater $QR_{(j+1)}$ 252, the outputs of the switch feeding respective ones of the L-side Q-blocks 254 of repeater $QR_{(j+1)}$ 252.

The FIG. 25 arrangement is effectively a combination of the arrangements of FIGS. 22 and 23 further adapted to enable the creation and 'banking' of multiple LLEs. Thus, as with the FIG. 23 arrangement, in the FIG. 25 arrangement the R-side Q-blocks 253 are continually sequentially and cyclically fired except, that is, for any R-side Q-block 253 associated with an existing 'banked' entanglement. At repeater $QR_{(j+1)}$, all the incoming light-fields are directed by the optical switch 217 to the same Q-block (as in the FIG. 22 arrangement) until a successful entanglement is created whereupon the optical switch is switched to pass the incoming light fields to a new, available (un-entangled), L-side Q-block 253. Each successful entanglement is reported to the repeater $QR_j$ in a LLEC 'success' message which also includes the ID of the L-side Q-block 253 concerned. The availability status of the R-side Q-blocks 253 and of the L-side Q-blocks 254 are respectively tracked by the R-LLE control unit 83' and L-LLE control unit 82'.

It may be noted, that the above-described feature of switching incoming light fields to a new, un-entangled target L-side Q-block upon an existing target Q-block becoming entangled, can also be used with the 'firing squad' arrangement of FIG. 22, that is, multiple target Q-blocks 224 are provided only one of which serves as the current target, this current target being changed immediately it becomes entangled. Operating in this way ensures an efficient use of the light fields fired by the firing squad 227.

The operation of the LLE control units 83' and 82' will next be described in terms of the interaction of their principle components rather than in terms of a controlling state machine. Considering first the R-LLE control unit 83', this comprises a firing control unit 243R, an R-side timeout monitor 244R, an available/non-available status register 245R, an R-side Entangled queue 246R which is a FIFO queue, and a status control unit 247R that controls the status register 245R and the R-side entangled queue 246R.

The status register 245R maintains an entry for each R-side Q-block 253, these entries being indexed by Q-block ID. Each entry comprises, for the Q-block concerned, an available/not-available bit and a qubit Capture interaction time for the last LLE-creation Capture interaction of the Q-block unless the LLE creation attempt concerned has been reported as having failed.

The firing control unit 243R controls the cyclic sequential firing of the R-side Q-blocks 253 and in doing so refers to the status register 245 to determine which Q-blocks 253 are available for firing. Whenever the firing control unit 243R fires a Q-block 253, the status control unit sets corresponding available/not-available bit of the register 245R to 'not-available'.

The LLEC 'success' and 'fail' messages received from the right-side neighbour node are passed to the status control unit 247. Each of these messages includes an indication of the ID of the R-side Q-block concerned and, for 'success' messages, also the ID of the L-side Q-block involved.

If an LLEC 'fail' message is received, the control unit 247R sets the available/not-available status-register bit of the Q-block explicitly or implicitly identified in the message, to 'available'. However, if an LLEC 'success' message is received, the available/not-available status-register bit of the Q-block concerned is not changed; instead, the control unit 247R places the ID of the R-side and L-side Q-blocks concerned in the R Entangled queue 246R. If this entry is now the current head entry, the control unit 247R sends an 'R entangled' signal to the merge control unit 87; if the entry is not the current head entry, no such signal is sent, the entry simply being queued.

The timeout monitor 244R continually monitors the age of the qubit of the R-side Q-block 253 at the head of the queue 246R by comparing the qubit Capture interaction time stored for this Q-block in the status register with the current time. When the qubit times out, the control unit 247R is informed which thereupon deletes the head entry of the queue 246R and sets the corresponding available/not-available bit of the register 245R to 'available'. If there is no other entry in the queue that can be moved up to the head of the queue, the control unit 247R sends a 'R expired' signal to the merge control unit 87.

The status control unit 247R is also arranged to receive the 'Reset R' signals from the merge control unit 87. Two types of 'Reset R' signal are provided by the merge control unit 87 in this embodiment—the first type, here called the 'Reset_All R' signal, is produced in response to the receipt of an RL-MC 'EchoMe' message by the merge control unit 87 whereas the second type, here called the 'Reset_Head R' signal, is produced in all other cases. On receiving a 'Reset_All R' signal, the control unit 247R deletes all entries in the queue 246R and resets all entries in the register 245R to indicate all Q-blocks as 'available'. On receiving a 'Reset_Head R' signal, the control unit 247R deletes the head entry of the queue 246R and sets the corresponding available/not-available bit of the register 245R to 'available'; if there is another entry in the queue 246R that can be moved up to the head of the queue, the control unit 247R sends a 'R entangled' signal to the merge control unit 87.

The overall effect of the above-described operation of the R-LLE control unit 83' is to queue right LLEs in queue 246R, the merge control unit 87 simply being told when the queue ceases to be empty ('R entangled' signal) and when it becomes empty again ('R expired' signal). The R-side Q-blocks of the queued LLEs are unavailable for firing by the firing control unit 243R.

Considering now the L-LLE control unit 82', this comprises a target control unit 243L, an L-side timeout monitor 244L, an available/non-available status register 245L, and a status control unit 247L that controls the status register 245L.

The status register 245L maintains an entry for each L-side Q-block 254, these entries being indexed by Q-block ID. Each entry comprises, for the Q-block concerned, (i) an available/not-available bit, (ii) a qubit Transfer interaction time for the last successful LLE-creation Transfer interaction of the Q-block, and (iii) parity information for the last successful LLE-creation Transfer interaction of the Q-block The target control unit 243L controls the optical switch 257 in dependence on the Q-block availability data in the status register 245L so that incoming light fields are all passed to the same 'available' L-side Q-block 254 until its status changes to 'not available' whereupon a new 'available' Q-block is selected as the target. The switch setting remains unchanged unless otherwise commanded by the target control unit 243L.

The Results signals 'L entangled'/'L not_entangled' from the current target Q-block 254 are passed to the status control unit 247L which send corresponding LLEC 'success' and 'fail' messages to the left neighbour node. Each of these messages includes an indication of the ID of the R-side Q-block concerned (derived, for example, from the time of arrival of the light field concerned in the current firing cycle, or by the light field's counted, position in the cycle); in addition, for 'success' messages, the ID of the L-side Q-block involved is also included. No other action is taken by the control unit 247L when receiving a 'L not_entangled' signal. However, when the control unit 247L receives an 'L entangled' signal, the control unit 247L sets the available/not-available status-register bit of the Q-block concerned to 'unavailable' thereby causing the target control unit 243L to select a new, available, Q-block as the target; the status control unit 247L also enters the current time into the status-register entry as the Transfer interaction time for the Q-block just entangled and stores left LLE parity information.

The timeout monitor 244L continually monitors the age of the oldest 'non-available' Q-block in the status register 245L by comparing the qubit Transfer interaction time stored for this Q-block with the current time. It is noted that the way the current repeater embodiment works, only this qubit and Q-block amongst L-side ones, could be participating in a L-side entanglement that is rooted in the left end node. When the qubit times out, the control unit 247L is informed which sets the corresponding available/not-available bit of the register 245L to 'available'; the control unit 247L also sends a 'L expired' signal to the merge control unit 87.

The status control unit 247R is also arranged to receive the 'Reset L' signals from the merge control unit 87. As for the Reset R signal, in the present embodiment there are two types of 'Reset L' signal provided by the merge control unit 87—the first type, here called the 'Reset_All' signal, is produced in response to the receipt of an RL-MC 'EchoMe' message by the merge control unit 87 whereas the second type, here called the 'Reset_This L' signal, is produced in all other cases and includes a specific L-side Q-block ID. On receiving a 'Reset_All L' signal, the control unit 247L resets all entries in the register 245L to indicate all Q-blocks as 'available'. On receiving a 'Reset_This L' signal, the control unit 247L sets the available/not-available status-register bit for the identified L-side Q-block to 'available'.

The overall effect of the above-described operation of the L-LLE control unit 82' is that the L-side Q-blocks of the queued entanglements are unavailable for selection as a target Q-block by the target control unit 243L.

With regard to the operation of the merge control unit 87, as already mentioned, this is substantially the same as for the merge control unit of the FIG. 10 embodiment. The main difference is that the LR-MC messages "merge succeeded" and "merge failed" both contain the ID of the L-side Q-block concerned (that is, the involved Q-block of the right neighbour node of the operative quantum repeater sending the message). In the case of a "merge failed" message, this enables the merge-control unit 87 of the receiving quantum repeater 240, to identify to the L-LLE control unit 82' of the repeater, in an 'Reset This L' signal, the L-side Q-block to be reset as 'available'. In the case of a "merge succeeded" message, the included L-side Q-block ID tells the merge control unit which L-side Q-block is to be used when the repeater is ready to perform a merge—the identity of the R-side Q-block to be used for the merge is retrieved when needed from the R-LLE control unit 83', this ID being the R-side ID contained in the head entry of the queue 246R.

After receiving a 'merge succeeded' LR-MC message, the merge control unit 87 will in due course attempt to effect a merge after which it will signal the LLE control units 82', 83' to reset the Q-blocks concerned (regardless of the outcome of the merge); the merge control unit 87 will, of course, already have the L-side ID it needs for inclusion in the 'Reset_This L' signal it outputs (the corresponding right-side signal 'Reset_Head R' does not require the ID of the R-side Q-block to be reset as this can be obtained from the head entry of the queue 246R). If the attempted merge was successful, the merge control unit 87 sends an LR-MC "merge succeeded" message that not only serves to tell the left neighbour repeater that it is now the operative repeater, but also to inform it of the ID of its L-side Q-block forming the current right-hand end of the entanglement being extended from the left end node; the relevant L-side Q block ID is inserted into the LR-MC "merge succeeded" by the merge control unit 87 after it has retrieved the ID from the head entry of the queue 246R. (which it does prior to sending the 'Reset_Head R' signal).

As regards parity information, when the MC unit 87 receives a 'merge succeeded' message it updates the cumulative parity information in the message by combining the received cumulative parity information with (i) the parity of the left LLE involved in merge to which the message relates (this information being retrieved from the status register 245L based on the L-side Q-block ID included in the received 'merge succeeded' message), and (ii) merge parity information for the merge subsequently carried out by the repeater.

It will be apparent from the foregoing that in the FIG. 24 quantum repeater embodiment, there is a good chance that as soon as a right LLE is used up in a merge operation or expires, there will be another right LLE immediately ready to use, this LLE having been banked in the queue 246R.

Banked LLEs can also be used in the process known as 'purification'. Purification raises the fidelity of an entanglement by combining two entanglements, via local quantum operations and classical communication, into one higher-fidelity pair.

With respect to the form and operation of the end nodes of a chain of nodes with intermediate repeater nodes of the FIG. 24 form, persons skilled in the art will, by reference to the foregoing description of the repeater 240, be able to determine the adaptations needed to the left and right end nodes described above in relation to the repeater 100 of FIG. 10.

Figure 26:
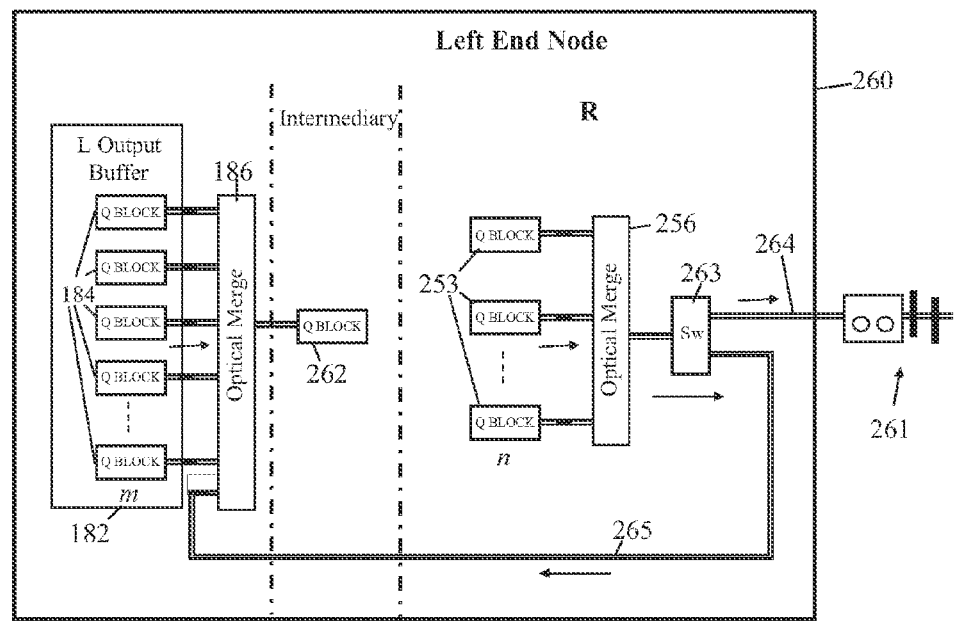
FIG. 26 is a diagram of an example left end node of a node chain having intermediate quantum-repeater nodes of the FIG. 24 form.

Where, as for the FIG. 24 embodiment, there are multiple L-side and/or R-side Q-blocks in an LLE creation subsystem, resulting in one or both of the associated end nodes having multiple Q-blocks, then if such a multi-Q-block end node is to be provided with an output buffer into which E2E entanglements can be shifted as described above with reference to FIG. 18, the arrangement depicted in FIG. 26 can usefully be employed to avoid the use of an n×m optical switch that would otherwise be required to interface the multiple L-side/R-side Q-blocks with the multiple Q-blocks of the output buffer.

More particularly, FIG. 26 depicts a left end node 260 having an R-side substantially as in the FIG. 25 LLE creation subsystem with n R-side Q-blocks 256 optically coupled through an optical merge unit 256 and local link fibre 264 to a chain 261 of repeater nodes. The end node 260 also includes an output buffer 182 of the FIG. 18 form with m Q-blocks 184, and an optical merge unit 186. To avoid the use of an n×m optical switch to optically couple any one of the R-side Q-blocks 256 to any one of the output-buffer Q-blocks 184, an intermediary Q-block 262 is provided. The Q-blocks 253 and 184 all have Capture interaction functionality whereas the intermediary Q-block 262 has Transfer interaction capability. A 1×2 optical switch 263 enables the output of the optical merge unit 256 to be switched between the local link fibre 264 and a loopback fibre 265 that feeds an input of the optical merge unit 186. This arrangement permits any selectively-fired one of the R-side Q-blocks 253 or any selectively-fired one of the output-buffer Q-blocks 184 to be coupled to the intermediary Q-block 262. As a result, the left end of an E2E entanglement anchored in one of the R-side Q-blocks 253 can be shifted across to the intermediary Q-block 262 and from there shifted into a selected one of the output-buffer Q-blocks 184, both shifts being effected by an elongate operation (see FIG. 1B); alternatively the selected output-buffer Q-block 184 can first be entangled with the intermediary Q-block 262 and a merge operation then effected between the latter and the R-side Q-block 253 anchoring the E2E entanglement.

Although the end node depicted, in FIG. 26 is a left end node with multiple R-side Q-blocks, the same approach can be used for a right end node with multiple L-side Q-blocks.

It will be appreciated that many variants are possible to the above described embodiments of the invention.

For example, where LLE creation subsystems of the FIG. 22 form are employed to give a high probability of successfully creating entanglements at each firing, then it would be possible to operate the FIG. 10 quantum repeater on the basis that a right LLE is assumed to have been created a predetermined time after firing of the firing squad (this predetermined time being the transit time of the light train 228 to the target qubit plus the time length of the light train and its herald). Transition from Pending state 111 to Right Entangled state 110 in FIG. 11 can thus be triggered on a time basis rather than receipt of an LLEC "success" message; this leads to a local merge operation being triggered when both a token has been received from the left neighbour node making the repeater the operative repeater, and a right-side qubit is expected to have been entangled with a qubit of the right neighbour node (as opposed to the existence of this latter entanglement having been confirmed by a "success" message). In fact, for the FIG. 10 embodiment, this variant is largely irrelevant as it is still necessary to await information from the right neighbour node enabling identification of the fusilier qubit that has been entangled and this information itself is effectively a "success" message. However, for the modification of the FIG. 10 embodiment discussed above in which the direction of LLE-creation light-field travel is made right-to-left while E2E entanglements are still built from the left end node, there is only one R qubit (a target qubit) in the quantum repeater so now a merge operation can be triggered once both the repeater is the operative repeater and the light-field train from the firing squad in its right neighbour node has been fully received. Unfortunately, this generally is also of no particular advantage as knowledge of when the light-field train has been fully received will not be earlier than when the result of the LLE creation attempt would in any case be known at the repeater through measurement of the target qubit.

For various reasons it may be desirable to arrange for the merging of leftward and rightward entanglements that is effected by a quantum repeater each cycle, to be carried out through the intermediary of one or more local qubits ('intermediate qubits') rather than directly by carrying out a merge operation of the form described above on the relevant repeater L-side and R-side qubits. For example, where one intermediate qubit is provided, the leftward and rightward entanglements can be separately extended to the intermediate qubit by respective elongate operations involving the entangled L-side/R-side qubit (as appropriate) and the intermediate qubit; thereafter, the intermediate qubit is removed, from entanglement by performing an X measurement operation upon it. It will be appreciated that the details of how the local merging of a repeater's leftward, and rightward entanglements is effected is not critical to the general manner of operation of a quantum repeater operating on the 'Extend-from-End' basis.

With regard to the implementation of the LLE control units 82, 83 and the merge control unit 87, it will be appreciated that typically the described functionality will be provided by a program controlled processor or corresponding dedicated hardware. Furthermore, the functionality of the LLE control units and the merge control unit may in practice be integrated, particularly in cases where the LLE control unit functionality is minimal. Of course, the division of control functionality is to a degree arbitrary; however, LLE control functionality merits separation into the LLE control units because in certain repeater embodiments LLE creation is free-running, that is, uncoordinated with higher level operations such as merge control. Overlying the LLE control functionality is the control functionality associated with merge control and the control of token passing—this latter control functionality effectively provides fop level control of the repeater and can be considered as being provided by a top-level control arrangement (in the described embodiments this is formed by the merge control unit, though it would also be possible for the token passing control to be separated out from the merge control unit into its own distinct control unit).

Although in the foregoing description light fields have generally been described as being sent over optical fibres both between nodes and between components of the quantum physical hardware of a repeater, it will be appreciated that light fields can be sent over any suitable optical channel whether guided (as with an optical waveguide) or unguided (straight line) and whether through free space or a physical medium. Thus, for example, the optical fabric of the quantum physical hardware of a repeater may comprise silicon channels interfacing with a qubit provided by a nitrogen atom in a diamond lattice located within an optical cavity.

As already indicated, persons skilled in the art will understand how the Q-blocks can be physically implemented and relevant example implementation details can be found in the following papers, herein incorporated by reference:

"Fault-tolerant quantum repeaters with minimal physical resources, and implementations based on single photon emitters" L. Childress, J. M. Taylor, A. S. Sørensen, and M. D. Lukin; Physics Review A 72, 052330 (2005).

"Fault-Tolerant Quantum Communication Based on Solid-State Photon Emitters" L. Childress, J. M. Taylor, A. S. Sørensen, and M. D. Lukin Physical Review Letters 96, 070504 (2006).

"Hybrid quantum repeater based on dispersive CQED interactions between matter qubits and bright coherent light" T D Ladd, P van Loock, K Nemoto, W J Munro, and Y Yamamoto; New Journal of Physics 8 (2006) 184, Published 8 Sep. 2006.

"Hybrid Quantum Repeater Using Bright Coherent Light" P. van Loock, T. D. Ladd, K. Sanaka, F. Yamaguchi, Kae Nemoto, W. J. Munro, and Y. Yamamoto; Physical Review Letters 96, 240501 (2006).

"Distributed Quantum Computation Based-on Small Quantum Registers" Liang Jiang, Jacob M. Taylor, Anders S. Sørensen, Mikhail D. Lukin; Physics. Review. A 76, 062323 (2007).

The invention claimed is:

1. A quantum repeater optically couplable to first and second neighbour nodes through local-link optical channels; the repeater comprising:
   quantum physical hardware providing first and second repeater portions (L, R) respectively arranged to support first and second qubits for entanglement with qubits in the first and second neighbour nodes respectively by light fields transmitted over the local-link channels thereby to form respective local link entanglements, herein "LLE"s; the quantum physical hardware being operable to merge two entanglements respectively involving a first and a second qubit, by locally operating on these qubits;
   first and second LLE control units for controlling the quantum physical hardware to effect creation of first and second LLEs in cooperation with the first and second neighbour nodes; and
   a top-level control arrangement operative to initiate a merging of entanglements respectively involving a first and a second qubit when both a token has been received from the first neighbour node, and there exists a condition that the second qubit concerned is at least expected to have been entangled with a qubit of the second neighbour node; the top-level control arrangement being arranged, in the case where the token is received before the said condition involving the second qubit exists, to await the existence of that condition before initiating the merging of entanglements; and the top-level control arrangement being further operative to send on the token to the second neighbour node following successful completion of said merging of entanglements.

2. A quantum repeater according to claim 1, wherein the quantum physical hardware provides for at least one of: multiple first qubits and multiple second qubits; the top-level control arrangement being arranged to initiate said merging of entanglements in respect of a first and a second qubit known or expected to be entangled.

3. A quantum repeater according to claim 1, wherein the top-level control arrangement is responsive to the outcome of said merging of entanglements to:
   on successful completion of said merging of entanglements, send a merge-succeeded message to the second neighbour node, this message serving as said token;
   on failure of said merging of entanglements, send merge-failed messages to the first and second neighbour nodes;
   the top-level control arrangement being responsive to a merge-failed message received from its second neighbour node to pass on this message to its first neighbour node and reset operation of the first and second repeater portions (L, R).

4. A quantum repeater according to claim 3, wherein the top-level control arrangement is arranged to include cumulative parity information in the merge-succeeded message, the top-level control arrangement forming this cumulative parity information by combining:
   cumulative parity information passed to the repeater in a merge-succeeded message received from its first neighbour node,
   parity information in respect of an entanglement between a said qubit of the repeater and a qubit in a neighbour node, and
   merge parity information in respect of the local merging of entanglements initiated by the top-level control arrangement.

5. A quantum repeater according to claim 1, wherein the first repeater portion (L) and the second repeater portion (R) are complimentary in form; one of these repeater portions (L, R) being operative to generate a light field, pass it through its qubit, and then send the light field out over a local link channel; and the other repeater portion (R, L) being operative to receive a light field over a local link channel, pass it through its qubit and then measure the light field.

6. A quantum repeater according to claim 1, wherein:
   one of the first and second repeater portions (L, R) comprises a plurality of fusilier Q-blocks each arranged to support a fusilier qubit and to pass a light field through that qubit, and an optical fabric for orderly coupling light fields that have passed through fusilier qubits, onto the corresponding local link channel; a corresponding one of the LLE control units being arranged to control this repeater portion to cause the coordinated passing of respective light fields through the fusilier qubits whereby to produce an outgoing train of closely-spaced light fields on the local link channel; and
   the other of the first and second repeater portions (R, L) comprises a target Q-block arranged to support a target qubit and to measure a light field passed through that qubit whereby to determine whether the target qubit has been successfully entangled, and an optical fabric for coupling the corresponding local link channel with the target Q-block to enable light fields of an incoming train of light fields received over the local link channel from a neighbour node to pass through the target qubit and be measured; a corresponding one of the LLE control units being arranged to control this repeater portion to allow a first light field of the train to pass through and potentially interact with the target qubit and thereafter only to allow a next light field through and potentially interact with the target qubit upon the target Q-block indicating that the preceding light field was unsuccessful in entangling the target qubit, this LLE control unit being responsive to the target Q-block indicating that the target qubit has been successfully entangled to pass, to the neighbour node originating the train, information identifying the light field of the train which successfully entangled the target qubit whereby to permit identification of the fusilier qubit entangled with the target qubit.

7. A quantum repeater according to claim 1, wherein the token is received at, and sent on from, the repeater over a communication channel independent of the local-link channels used for said light fields.

8. A system, comprising a chain of nodes, for creating an end-to-end entanglement between working qubits in first and second opposite end nodes of the chain, intermediate nodes of the chain being formed by quantum repeaters according to any one of claim 1 with each quantum repeater being linked to its neighbour nodes by local link optical channels; wherein:
the first end node is arranged to cooperate with its neighbouring quantum-repeater node to create an initial entanglement between a said working qubit in the first end node and the first qubit of the quantum-repeater node, and
following creation of the initial entanglement, the involved quantum repeater behaves as having received said token and, as and when its second qubit is at least expected to have been entangled with a qubit in the repeater's second neighbour node, initiates a merging of entanglements thereby to extend the initial entanglement to the next quantum-repeater node along the chain towards the second end node;
the extending of the initial entanglement along the chain thereafter progressing node by node as the token is passed from quantum repeater to quantum repeater until the second end node is reached.

9. A system according to claim 8, wherein each end node includes an output buffer arranged to provide a qubit into which the end of the end-to-end entanglement that is anchored in a working qubit of the end node, can be transferred in order to free up that working qubit.

10. A method of creating an end-to-end entanglement between qubits in first and second end nodes of a chain of nodes whose intermediate nodes are quantum repeaters, the method comprising:
entangling a qubit in the first end node with a qubit in the neighbouring quantum-repeater node to create an initial entanglement, and
iteratively extending the initial entanglement along the chain until the second end node is reached;
each iteration involving a quantum repeater of the chain, herein the operative repeater, merging, in a merge operation, an entanglement existing between qubits in the first end node and the operative repeater, with a local entanglement formed between qubits in the operative repeater and its neighbour node towards the second end node; the operative repeater for the first iteration being the neighbour of the first end node and shifting for each new iteration one node further along the chain toward the second end node; a quantum repeater of the chain becoming the operative repeater upon receipt of a token from its neighbour node towards the first end node, and the operative repeater:
initiating its merge operation upon receipt of the token provided a local entanglement exists with its neighbour node towards the second end node,
in the case of the token being received before the existence of a local entanglement with its neighbour node towards the second end node, awaiting the establishment of that entanglement before initiating its merge operation;
sending a token to its neighbour node towards the second end node following successful completion of its merge operation.

11. A method according to claim 10, wherein, following an attempted said merge operation, the operative repeater:
where the attempted merge operation is successful, sends a merge-succeeded message to its neighbour node towards the second end node, this message serving as said token causing that neighbour node, unless it is the second end node, to become the operative repeater;
where the attempted merge operation fails, sends merge-failed messages to both neighbour nodes;
each repeater responding to the receipt of a merge-failed message from its neighbour node towards the second end node, by resetting itself and passing on the merge-failed message to its other neighbour node.

12. A method according to claim 11, wherein the operative repeater is arranged to include cumulative parity information in the merge-succeeded message, the operative repeater forming this cumulative parity information by combining:
cumulative parity information passed to the repeater in a merge-succeeded message received from its neighbour node towards the first end node,
parity information in respect of an entanglement between a said qubit of the repeater and a qubit in a neighbour node, and
merge parity information in respect of the merging of entanglements triggered by the merge control unit.

13. A method according to claim 10, further comprising, following the creation of an end-to-end entanglement between working qubits of the end nodes, transferring each end of the end-to-end entanglement across into respective buffer qubits of the end nodes.

* * * * *